(12) United States Patent
Berbaum et al.

(10) Patent No.: US 7,801,702 B2
(45) Date of Patent: *Sep. 21, 2010

(54) ENHANCED DIAGNOSTIC FAULT DETECTION AND ISOLATION

(75) Inventors: Richard D. Berbaum, Maine, NY (US); Edward R. Bestle, Owego, NY (US)

(73) Assignee: Lockheed Martin Corporation, Bethesda, MA (US)

( * ) Notice: Subject to any disclaimer, the term of this patent is extended or adjusted under 35 U.S.C. 154(b) by 1092 days.

This patent is subject to a terminal disclaimer.

(21) Appl. No.: 10/998,831

(22) Filed: Nov. 30, 2004

(65) Prior Publication Data

US 2005/0223290 A1    Oct. 6, 2005

Related U.S. Application Data

(60) Provisional application No. 60/543,618, filed on Feb. 12, 2004.

(51) Int. Cl.
    *G06F 11/30* (2006.01)
(52) U.S. Cl. .................. 702/185; 702/183; 702/108; 702/119; 702/58; 701/29; 701/31
(58) Field of Classification Search .............. 702/113, 702/182, 183, 185, 188, 57, 58, 59, 75, 76, 702/77, 117, 124, 125; 701/29, 31, 33, 34
See application file for complete search history.

(56) References Cited

U.S. PATENT DOCUMENTS

| | | | | |
|---|---|---|---|---|
| 4,371,952 A | | 2/1983 | Schuck | 364/900 |
| 4,412,281 A | | 10/1983 | Works | 364/200 |
| 4,570,261 A | | 2/1986 | Maher | 371/16 |
| 4,634,110 A | * | 1/1987 | Julich et al. | 714/11 |
| 4,943,919 A | * | 7/1990 | Aslin et al. | 701/3 |
| 5,157,667 A | | 10/1992 | Carusone, Jr. et al. | 371/29.1 |
| 5,223,788 A | | 6/1993 | Andreano et al. | 324/158 |
| 5,293,323 A | * | 3/1994 | Doskocil et al. | 702/185 |
| 5,357,519 A | * | 10/1994 | Martin et al. | 714/25 |
| 5,408,218 A | | 4/1995 | Svedberg et al. | 340/507 |
| 5,455,921 A | | 10/1995 | DeFilipps et al. | 395/494 |

(Continued)

FOREIGN PATENT DOCUMENTS

JP    2003002298 A    1/2003

OTHER PUBLICATIONS

Mathur, A. et al, An Integrated Support System for Rotorcraft Health Management and Maintenance, Mar. 18-25, 2000, Aerospace Conference Proceedings, 2000 IEEE, vol. 6, pp. 1-8.*

(Continued)

*Primary Examiner*—Hal D Wachsman
*Assistant Examiner*—Mi'schita' Henson
(74) *Attorney, Agent, or Firm*—Miles & Stockbridge PC; James T. Carmichael; Stephen W. Aycock, II

(57) ABSTRACT

A system and method for enhanced diagnostic fault detection and isolation is provided, wherein COTS/MOTS subsystems of a system under test are evaluated in a hierarchical manner providing improved test coverage and a reduction in ambiguity group size. The enhanced diagnostic fault detection and isolation method may proceed from automatic built-in-test to initiated built-in-test and finally to manual tests. At each stage of the testing, results may be evaluated to determine which, if any, components need replacing. The diagnostic system may report the results of testing in a fault log and/or a look-up table structure. The systems and methods of the present invention are suited to testing systems that incorporate COTS or MOTS subsystem components, and for use with an interactive electronic technical manual (IETM). Further, the diagnostic system is adaptable to a variety of subsystem interface protocols.

26 Claims, 15 Drawing Sheets

U.S. PATENT DOCUMENTS

| | | | |
|---|---|---|---|
| 5,479,610 A * | 12/1995 | Roll-Mecak et al. | 714/25 |
| 5,600,791 A | 2/1997 | Carlson et al. | 395/184.01 |
| 5,649,094 A | 7/1997 | Hayashi et al. | 395/183.06 |
| 5,712,972 A | 1/1998 | Kakkar | 395/183.05 |
| 5,748,883 A | 5/1998 | Carlson et al. | 395/184.01 |
| 5,805,793 A | 9/1998 | Green | |
| 5,931,877 A | 8/1999 | Smith et al. | |
| 5,937,366 A | 8/1999 | Zbytniewski et al. | 702/108 |
| 5,978,841 A | 11/1999 | Berger | |
| 6,003,808 A | 12/1999 | Nguyen et al. | |
| 6,122,575 A | 9/2000 | Schmidt et al. | |
| 6,125,312 A | 9/2000 | Nguyen et al. | |
| 6,219,626 B1 * | 4/2001 | Steinmetz et al. | 702/183 |
| 6,226,675 B1 | 5/2001 | Meltzer et al. | |
| 6,240,407 B1 | 5/2001 | Chang et al. | |
| 6,240,526 B1 | 5/2001 | Petivan et al. | 714/11 |
| 6,317,659 B1 | 11/2001 | Lindsley et al. | |
| 6,341,358 B1 | 1/2002 | Bagg et al. | |
| 6,421,656 B1 | 7/2002 | Cheng et al. | |
| 6,463,440 B1 | 10/2002 | Hind et al. | |
| 6,476,828 B1 | 11/2002 | Burkett et al. | |
| 6,480,974 B1 | 11/2002 | Porterfield | 714/43 |
| 6,487,479 B1 | 11/2002 | Nelson | |
| 6,510,434 B1 | 1/2003 | Anderson et al. | |
| 6,529,620 B2 | 3/2003 | Thompson | |
| 6,539,337 B1 | 3/2003 | Provan et al. | 702/183 |
| 6,556,986 B2 | 4/2003 | Hara et al. | |
| 6,567,079 B1 | 5/2003 | Smailagic et al. | |
| 6,572,376 B1 | 6/2003 | Saunders | |
| 6,574,537 B2 | 6/2003 | Kipersztok et al. | |
| 6,625,618 B1 | 9/2003 | Arai | |
| 6,654,905 B1 | 11/2003 | Dickens | 614/10 |
| 6,662,089 B2 | 12/2003 | Felke et al. | |
| 6,665,811 B1 | 12/2003 | de Azevedo et al. | 714/4 |
| 6,675,324 B2 | 1/2004 | Marisetty et al. | 714/30 |
| 6,697,718 B2 | 2/2004 | Le Draoullec et al. | |
| 6,701,457 B2 | 3/2004 | Reynolds et al. | 714/31 |
| 6,721,727 B2 | 4/2004 | Chau et al. | |
| 6,725,137 B2 | 4/2004 | Eagleton et al. | |
| 6,732,109 B2 | 5/2004 | Lindberg et al. | |
| 6,738,929 B2 | 5/2004 | Swoboda et al. | 714/28 |
| 6,772,369 B2 | 8/2004 | Smith et al. | 714/31 |
| 6,782,380 B1 | 8/2004 | Thede | |
| 6,804,677 B2 | 10/2004 | Shadmon et al. | |
| 6,829,527 B2 | 12/2004 | Felke | |
| 6,959,235 B1 | 10/2005 | Abdel-Malek et al. | |
| 6,961,897 B1 | 11/2005 | Peel et al. | |
| 6,973,596 B2 | 12/2005 | Halphide et al. | |
| 7,174,286 B2 | 2/2007 | Martin et al. | |
| 2002/0004804 A1 | 1/2002 | Muenzel | |
| 2002/0065822 A1 | 5/2002 | Itani | |
| 2002/0085020 A1 | 7/2002 | Carroll, Jr. | |
| 2002/0087236 A1 * | 7/2002 | Moccio | 701/29 |
| 2002/0116371 A1 | 8/2002 | Dodds et al. | |
| 2002/0143803 A1 | 10/2002 | Chen et al. | |
| 2002/0147726 A1 | 10/2002 | Yehia et al. | |
| 2002/0147748 A1 | 10/2002 | Huang et al. | 707/517 |
| 2002/0165872 A1 | 11/2002 | Meltzer et al. | |
| 2002/0174387 A1 | 11/2002 | Lohoff et al. | |
| 2002/0184111 A1 | 12/2002 | Swanson | |
| 2002/0196281 A1 | 12/2002 | Audleman et al. | |
| 2002/0198639 A1 | 12/2002 | Ellis et al. | |
| 2003/0004998 A1 | 1/2003 | Datta | |
| 2003/0009710 A1 | 1/2003 | Grant | |
| 2003/0018661 A1 | 1/2003 | Darugar | |
| 2003/0025732 A1 | 2/2003 | Prichard | |
| 2003/0028858 A1 | 2/2003 | Hines | |
| 2003/0037238 A1 | 2/2003 | Warner et al. | |
| 2003/0055945 A1 | 3/2003 | Bear et al. | |
| 2003/0074636 A1 | 4/2003 | Manepalli | |
| 2003/0083794 A1 * | 5/2003 | Halm et al. | 701/29 |
| 2003/0109973 A1 | 6/2003 | Hensey et al. | |
| 2003/0110192 A1 | 6/2003 | Valente et al. | |
| 2003/0120686 A1 | 6/2003 | Kim et al. | |
| 2003/0126129 A1 | 7/2003 | Watson | |
| 2003/0126136 A1 | 7/2003 | Omoigui | |
| 2003/0135825 A1 | 7/2003 | Gertner et al. | |
| 2003/0146937 A1 | 8/2003 | Lee | |
| 2003/0149934 A1 | 8/2003 | Worden | |
| 2003/0184585 A1 | 10/2003 | Lin et al. | |
| 2003/0187751 A1 | 10/2003 | Watson et al. | |
| 2003/0191564 A1 | 10/2003 | Haugse et al. | |
| 2003/0200533 A1 | 10/2003 | Roberts et al. | |
| 2003/0204332 A1 | 10/2003 | Beney et al. | |
| 2003/0204481 A1 | 10/2003 | Lau | |
| 2003/0204511 A1 | 10/2003 | Brundage et al. | |
| 2003/0212664 A1 | 11/2003 | Breining et al. | |
| 2003/0215128 A1 | 11/2003 | Thompson | |
| 2003/0237046 A1 | 12/2003 | Parker et al. | |
| 2004/0020994 A1 | 2/2004 | Muehl et al. | |
| 2004/0024501 A1 | 2/2004 | Muehl et al. | |
| 2004/0034456 A1 | 2/2004 | Felke et al. | |
| 2004/0039499 A1 | 2/2004 | Felke et al. | |
| 2004/0060007 A1 | 3/2004 | Gottlob et al. | |
| 2004/0078123 A1 | 4/2004 | Igloi et al. | |
| 2004/0098311 A1 | 5/2004 | Nair et al. | |
| 2004/0128617 A1 | 7/2004 | Oh | |
| 2004/0143599 A1 | 7/2004 | Shalabi et al. | |
| 2004/0153448 A1 | 8/2004 | Cheng et al. | |
| 2004/0172597 A1 | 9/2004 | Canali et al. | |
| 2004/0177321 A1 | 9/2004 | Brown et al. | |
| 2004/0183831 A1 | 9/2004 | Ritchy et al. | |
| 2004/0193962 A1 | 9/2004 | Johnson et al. | |
| 2004/0205082 A1 | 10/2004 | Fontoura et al. | |
| 2004/0205571 A1 | 10/2004 | Adler et al. | |
| 2004/0205609 A1 | 10/2004 | Milton et al. | |
| 2004/0216003 A1 | 10/2004 | Floyd et al. | 714/25 |
| 2004/0221260 A1 | 11/2004 | Martin et al. | |
| 2004/0267813 A1 | 12/2004 | Rivers-Moore et al. | |
| 2004/0268306 A1 | 12/2004 | Cheng et al. | |
| 2005/0004892 A1 | 1/2005 | Brundage et al. | |
| 2005/0021548 A1 | 1/2005 | Bohannon et al. | |
| 2005/0027480 A1 * | 2/2005 | Qiao et al. | 702/183 |
| 2005/0055336 A1 | 3/2005 | Hui et al. | |
| 2005/0060317 A1 | 3/2005 | Lott et al. | |
| 2005/0114090 A1 * | 5/2005 | Black et al. | 702/188 |
| 2005/0132282 A1 | 6/2005 | Panditharadhya et al. | |
| 2005/0138544 A1 | 6/2005 | Beck et al. | |
| 2005/0165724 A1 | 7/2005 | West | |
| 2005/0182650 A1 | 8/2005 | Maddox et al. | |
| 2005/0183007 A1 * | 8/2005 | Gaug et al. | 715/513 |
| 2005/0193275 A1 | 9/2005 | Gohel | |
| 2005/0223288 A1 | 10/2005 | Berbaum | |
| 2005/0240289 A1 | 10/2005 | Hoyte et al. | |
| 2005/0240555 A1 | 10/2005 | Wilde | |
| 2005/0283694 A1 * | 12/2005 | Shabib et al. | 714/733 |
| 2006/0085465 A1 | 4/2006 | Nori et al. | |
| 2006/0085692 A1 | 4/2006 | Berbaum | |
| 2006/0120181 A1 | 6/2006 | Berbaum | |
| 2006/0218512 A1 | 9/2006 | Arslan et al. | |
| 2006/0236224 A1 | 10/2006 | Kuznetsov et al. | |

OTHER PUBLICATIONS

Department of Defense Handbook for Interoperability of Interactive Electronic Technical Manuals (IETMs), May 15, 2000, Department of Defense, MIL-HDBK-511.*
U.S. Appl. No. 10/957,608, Office Action dated Jul. 6, 2007.
bDynamics, Long Wave Incorporated, www.longwaveinc.com/products-bydynamics.htm (5 pages).
IETM Generation from FrameMaker or Word, Live Linx, www.livelinx.com/content/products-ietm.html (2 pages).

Interactive electronic technical manual said to be world first, Dataweek, Electronics & Communication Technology, Oct. 8, 2003, dataweek.co.za/news.asp?pklNnewsID=12301&pklIssueID=357&pklCategoryID=31.

On board real time Fault Detection Isolation and Reconfiguration, Qualtech Systems, www.teams-rds.com/fdir/fdir_home.htm (3 pages).

Simplify, Link, and Integrate Your Technical Data, Continental Datagraphics, www.cdgnow.com.

Interactive Electronic Technical Manual (IETM), Direct Reporting Program Manager Advanced Amphibious, www.efv.usmc.mil/logistics/IETM.html (2 pages).

Boeing Quill 21, www.boeing.com/defense-space/aerospace/techdata/quill.htm (2 pages).

The recognized technology lead advanced integrated diagnostics and intelligent support system, Qualtech Systems, www.teams-rds.com/diagnostics_home.html (4 pages).

Affidavit of Richard Berbaum.
U.S. Appl. No. 11/019,295, Office Action dated Sep. 17, 2007.
U.S. Appl. No. 11/562,336, filed Nov. 21, 2006, Matthew R. Liberty.
U.S. Appl. No. 11/466,478, filed Aug. 23, 2006, Matthew R. Liberty.
Udell, Jon, "Lightweight XML Search Servers", Jan. 21, 2004.
Qualls, Michael, "Searching an XML File with XSL and ASP".
"XML and Search"; http://www.searchtools.com/info/xml.html.
U.S. Appl. No. 11/019,295, Office Action dated Apr. 4, 2007.
U.S. Appl. No. 11/241,937, Office Action dated May 23, 2007.
U.S. Appl. No. 11/019,295, Office Action dated Apr. 28, 2008.
U.S. Appl. No. 11/466,478, Office Action dated Aug. 22, 2008.
U.S. Appl. No. 11/242,855, Notice of Allowance dated Dec. 24, 2008.
U.S. Appl. No. 11/466,478, Office Action dated Feb. 17, 2009.
U.S. Appl. No. 10/998,802, Office Action dated Nov. 4, 2008.
U.S. Appl. No. 11/019,295, Office Action dated Nov. 5, 2008.
U.S. Appl. No. 11/466,478, Final Office Action dated Feb. 17, 2009.

* cited by examiner

ENHANCED DIAGNOSTIC FAULT DETECTION AND ISOLATION

This application claims the benefit of U.S. Provisional Application No. 60/543,618, filed Feb. 12, 2004, which is incorporated herein by reference.

The present invention relates generally to diagnostic systems and methods and, more particularly, to diagnostic systems and methods for troubleshooting a complex system, such as a military aircraft, to identify one or more components, such as one or more weapon replaceable assemblies (WRAs) or lower level components, that has failed.

Complex systems, such as, for example, military aircraft may be designed using existing Commercial Off-The-Shelf (COTS) components or Modified Off-The-shelf (MOTS) components. The COTS/MOTS design methodology allows the designer or system engineer to utilize readily available components that may meet the system requirements with little or no modification. Another advantage of the COTS/MOTS components may be that a design and development cycle may not be required for the individual components, thus freeing a system engineer to focus on system integration and testing issues.

While systems designed with COTS/MOTS components may enjoy the advantages described above, they may also be subject to limitations. One of the potential limitations of systems designed with COTS/MOTS components may be testability. The testability of a system may rely on the individual test features built into the COTS/MOTS component, thus the limited test capability may not fully provide interface testing, subsystem testing, and/or full system testing capabilities.

A typical requirement of complex systems, particularly in military applications, may be for the provision of enhanced diagnostic fault detection and isolation capabilities. Further, based on the complexity of the system under test (SUT), the enhanced diagnostic fault detection and isolation system may be required to automatically interact with the SUT.

Maintenance, including the reliable troubleshooting of complex systems, may be a common issue in various industries, including the aircraft and automotive industries, the electronics industry, the defense industry and the like. In the military, for example, maintenance of an aircraft may be of importance to ensure the continued safe, efficient and effective operation of the aircraft. Minimum ground time between flights may be desirable to maximize asset utilization and to meet the established mission goals. Therefore, the time allocated to unscheduled maintenance may often be limited to the relatively short time that the aircraft is required to be on the ground in order to permit reloading of munitions and ordnance, to refuel and to otherwise service the aircraft.

Properly performing unscheduled maintenance in both an accurate and timely manner may be critical in a battlefield situation. Troubleshooting a combat aircraft which may be an extremely large and complex system comprised of many interconnected subsystems may be particularly difficult. In the COTS/MOTS design methodology, each subsystem may typically be comprised of many WRAs that may be individually replaceable. A WRA may be mechanical, such as a valve or a pump; electrical, such as a switch or relay; or electronic, such as an autopilot or a flight management computer. Many WRAs are, in turn, interconnected. As such, the symptoms described by flight deck effects or other observations may indicate that a fault in more than one WRA may explain the presence of the observed symptoms. At that point, there may be ambiguity about which WRA(s) have actually failed. Additional information may be needed to disambiguate between the possibilities.

Given the complexity of modern military aircraft, computers are often used to assist in the diagnostic and maintenance processes. An example is the Integrated Electronic Technical Manual (IETM). The IETM is an electronic version of the technical manual for an aircraft that is coupled with a computer system capable of interfacing with the aircraft to interrogate the systems of the aircraft in order to better diagnose the aircraft.

The present invention provides an enhanced diagnostic fault detection and isolation approach that may be compatible with automated equipment such as the IETM, for example. Further, the systems and methods of the present invention provide the flexibility to integrate with the various COTS/MOTS subsystem components of an SUT. Accordingly, the systems and methods of the present invention may overcome the testability limitation of systems designed using COTS/MOTS components by providing a diagnostic approach that may be configurable to test each unit under test (UUT) within an SUT thereby providing a comprehensive testing capability to a system that incorporates COTS/MOTS components.

DETAILED DESCRIPTION

Figure 1:
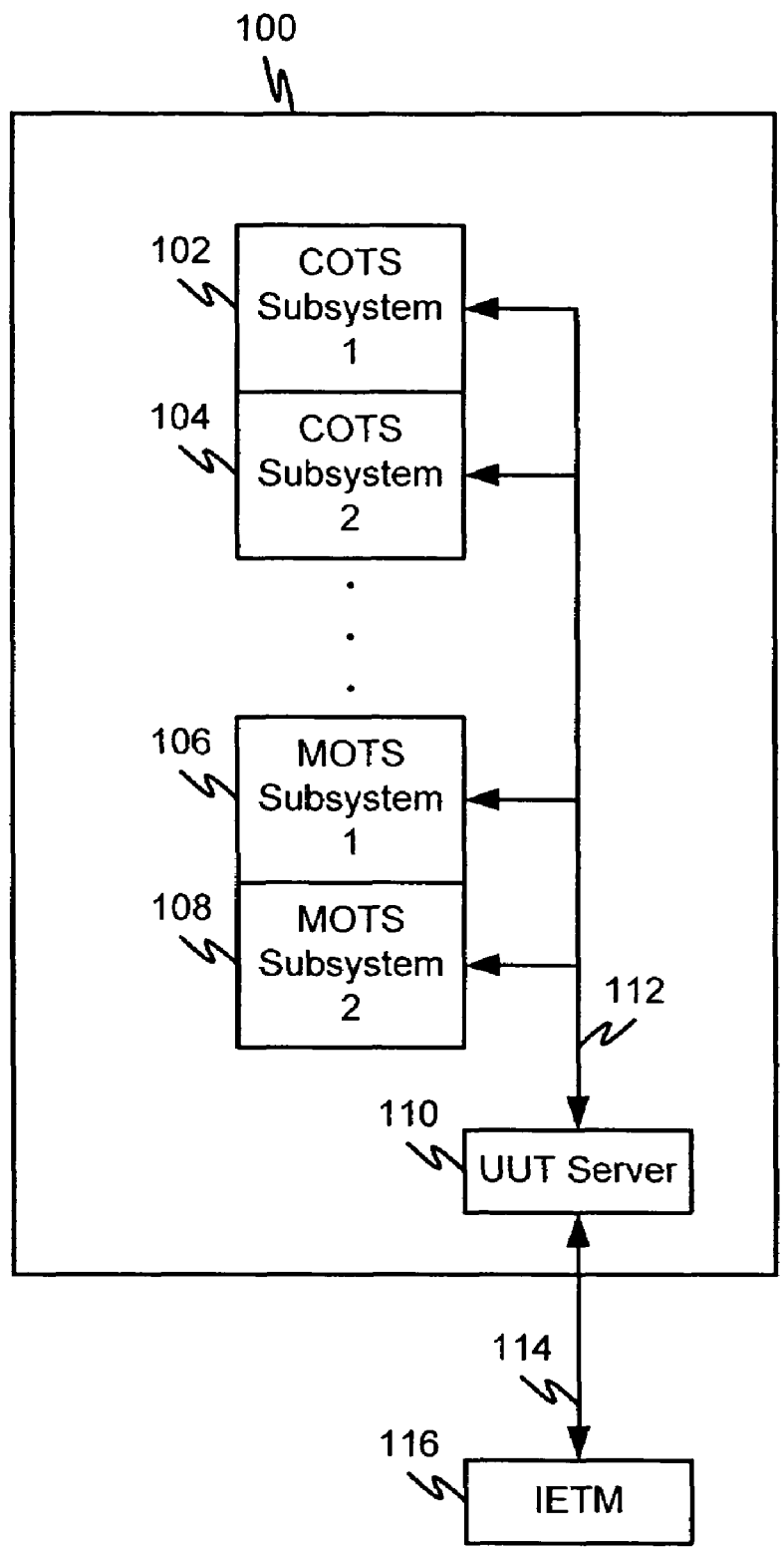
FIG. 1 is a block diagram of an exemplary embodiment of an enhanced diagnostic fault detection and isolation system in accordance with the present invention.

The enhanced diagnostic fault detection and isolation systems and methods of the present invention are described below in relation to an Integrated Electronic Technical Manual (IETM) for purposes of illustration. However, it should be appreciated that the enhanced diagnostic fault detection and isolation systems and methods of the present invention may be used with other types of equipment and in other operational environments, such as on a personal computer, incorporated within a system under test, on a handheld computing device, and/or the like.

According to the present invention, improved enhanced diagnostic fault detection and isolation systems and methods are provided. Since the enhanced diagnostic fault detection and isolation system and method may be particularly useful in the aircraft industry, the enhanced diagnostic fault detection and isolation system and method will be hereinafter described and illustrated in conjunction with the troubleshooting of an aircraft. However, the diagnostic system and method may be used to troubleshoot any system having a number of interconnected components, such as the complex systems created by the automotive, marine, electronics, power generation and computer industries, for example.

In general, the enhanced diagnostic fault detection and isolation methods and systems of the present invention are based on a divide and concur flow control methodology. Functional test tasks (called checkout tasks) can be built from a number of sequential subtasks. The sequential execution of these subtasks build on the successful completion of prior subtasks. This allows the system to fault diagnose/fault isolate (FD/FI) root causes of failures. It would not be valid to FD/FI a UUT if the interface to the UUT or the controlling computer to the UUT were failing. To test a subsystem or WRA, the required components between the IETM and the UUT are verified as operational, such as, for example, connectivity to the controlling computer. Once the controlling computer is verified as functional, the input/output (I/O) from the UUT is verified as valid before testing the UUT.

For example, in testing a WRA that is controlled by a mission computer over a 1553 interface, assume the 1553 interface is not connected to the mission computer or the wires have been severed for both channels. The IETM diagnostics of the present invention first verifies communications to the mission computer. Once communication has been validated, the mission computer is tested. Once the mission computer has been verified to be operational and no built in test (BIT) errors are reported, the 1553 interface is checked for communication to the various subsystems. In this case, no valid communication to any of the WRAs is possible since the interface is either not connected or broken. Fault detection has occurred within the critical path to the UUT and therefore would require fault isolation to the root cause since the 1553 is required to communicate to the UUT. Fault isolation may be accomplished by sequential execution of those subtasks built upon the successful completion of prior subtasks. In this case, the 1553 interface channels are routed via different paths of the system, thus eliminating the possibility the problem could be any place else but near or at the source of the 1553 communication. Through the various subtask tests (verify connection, inspections, and testing continuity, etc . . . ) of the 1553 prerequisite test, the fault would be isolated to the interface wiring. If this prerequisite test were not executed, FD/FI would not have correctly isolated to the root cause. Testing of the UUT never occurred in the above example because the fault was detected and isolated within the prerequisite test (root cause). The prerequisite tests in this example were the IEETM, IETM to mission computer connection, mission computer, and then mission computer interface to the UUT.

Variations of the prerequisite tests may be determined by physical hierarchy of the SUT and UUT. In the example above, if the UUT were connected to an Aeronautical Radio, Inc. (ARINC) 429 interface instead of the 1553, for example, and the ARINC 429 interface was working, the UUT would have been tested because it is not dependent upon the 1553 being functional. In fact, the 1553 prerequisite would not have been called since it is not part of the data path to the UUT.

Accordingly, prerequisite testing may be broken down into the finest parts to allow specific testing to be conducted so the path between the IETM and the UUT can be validated without interfering with the test results.

The fault group for the above example fault would have been automatically isolated to the interface wiring at the mission computer, 1553 address, and lastly the mission computer. As determined by eliminating those tests that did pass, the physical connection and routing of the interface wiring, and architecture of the system under test. In this case coordination of the I/O status of all the other WRAs on the 1553 may determine that the other WRAs could not communicate to the controlling computer.

Fault isolation ends when a fault group has been determined. The fault group at this point is a list of faults that can represent the root cause of the problem. Selecting one of the faults in the fault group will link to a Remove and Replace (R/R) procedure or a repair procedure depending on the fault.

The testing of individual UUTs may incorporate tests with overlapping scope. The enhanced diagnostic fault detection and isolation may be optimized with respect to time of test by setting a flag that indicates to the IETM that testing should not be repeated for elements. In other words, if the testing for two UUTs requires the testing of the mission computer, the second UUT test can rely on the first test of the mission computer if it passed. Optimization may enable a test to be completed in less time as compared to a test without optimization enabled.

FIG. 1 is a block diagram of an exemplary embodiment of an enhanced diagnostic fault detection and isolation system in accordance with the present invention. In particular, the system under test (SUT) 100 comprises a first COTS subsystem 102, a second COTS subsystem 104, a first MOTS subsystem 106 and a second MOTS subsystem 108, all connected by links 112 to a Unit Under Test (UUT) server 110. The exemplary SUT 100 shown in FIG. 1 is a limited system for purposes of illustration and may not represent the potential complexity of an aircraft or other complex system. It should be appreciated that the systems and methods of the present invention can be used on complex systems with varying quantities and configurations of subsystems. An IETM 116 is connected by a link 114 to the UUT server 110. The links 112 and the link 114 may be wired links, such as, for example, serial, Ethernet, USB, and/or the like. Alternatively, the links 112 and the link 114 may be wireless links, such as, for example, radio frequency, light, and/or the like. In general, the links 112 and the link 114 may be any known, or later developed element(s), capable of interfacing with the components as shown in FIG. 1 and communicating data between the components as shown in FIG. 1 may be used.

In operation, the IETM executes an enhanced diagnostic fault detection task sequence in accordance with the present invention. The diagnostic task sequence generates commands, which are sent from the IETM 116 to the UUT server 110 via the link 114. The commands test the subsystem in a hierarchical fashion and build on one another. In other words, the enhanced diagnostic fault detection task sequence has been designed to test the subsystem in an order that permits subsequent tests to build on the results of previous tests. For example, the enhanced diagnostic fault detection task sequence may test the COTS box 1 102 first, then test the MOTS box 2 108, then test the MOTS box 1 106 and, finally, test COTS box 2 104. The order of tests may depend on a number of factors including a subsystem function and a subsystem interconnection configuration.

The UUT server 110 provides access to the COTS/MOTS subsystem built-in-test functionality, as well as the subsystem interface functionality. The UUT 110 server provides a low-level interface between the IETM and the individual subsystems. By keeping the UUT server 110 operating as a low-level interface, the subsystems may contain operational software and the ETM may contain high-level test software. This layering of the functionality may be efficient for purposes of testing and certification. In safety critical systems, such as, for example, avionics, it may often be desirable to keep the amount of software, and hence the amount of software changes, to a minimum in order to reduce the need for re-testing and/or re-qualification when the software is updated with changes.

The enhanced diagnostic fault detection and isolation system may be operated fully automatically, fully manually or in a combination of automatic and manual modes.

The enhanced diagnostic fault detection and isolation system provides fast built-in-test result interpretation. This may allow a complex system to be diagnosed rapidly. In addition to automated testing and interpreting of results, the enhanced diagnostic fault detection and isolation system also provides the capability for manual testing in cases where automated testing may be either impractical or impossible. In such cases, the enhanced diagnostic fault detection and isolation sequence guides the user through the steps necessary to perform the manual test. Further, the IETM queries the user for result input and uses the results for fault detection and isolation in conjunction with automated test results. The combination of automated and manual testing provides a balance between speed of testing and completeness of test coverage, depending upon the contemplated uses of the present invention.

Figure 2:
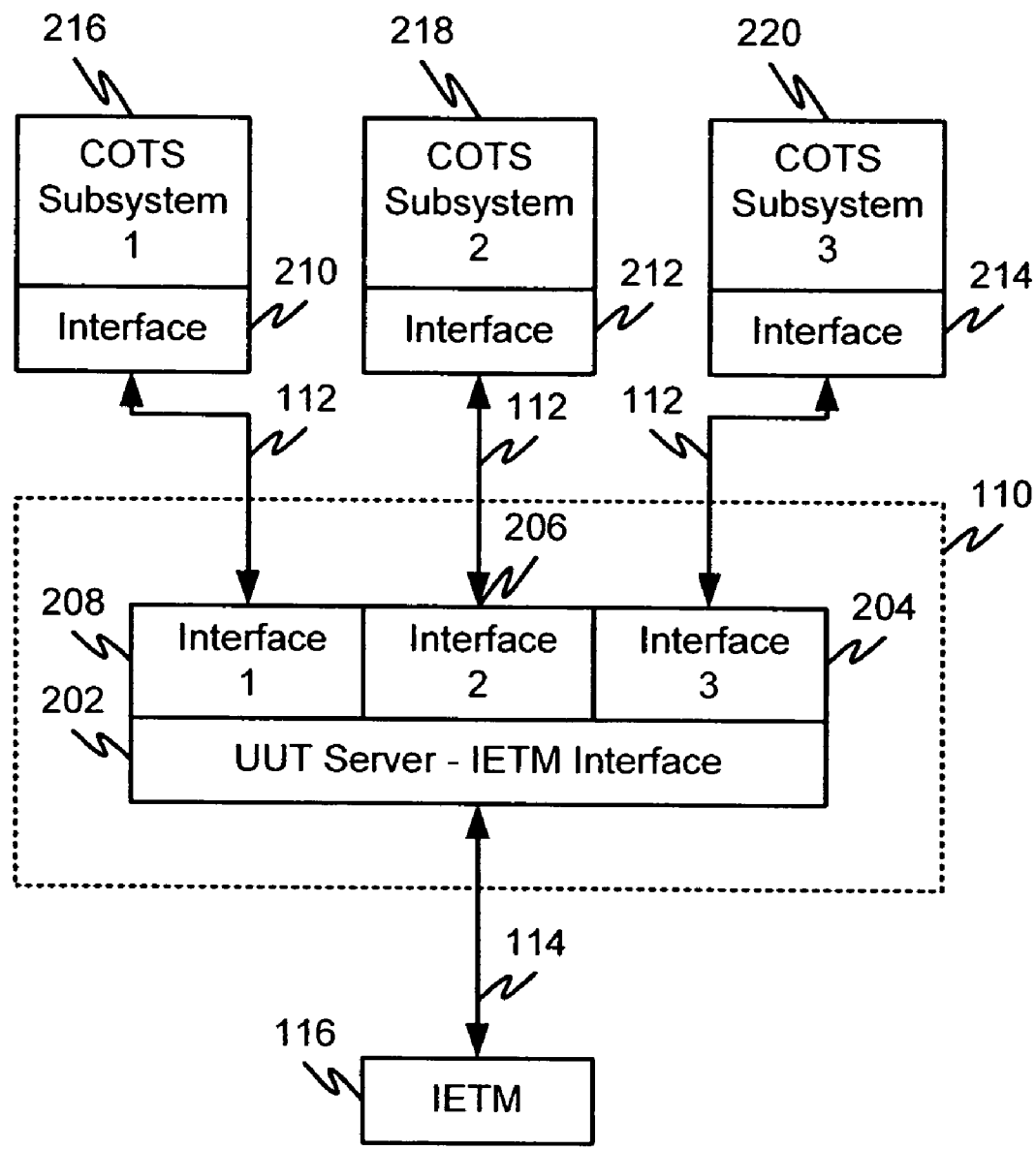
FIG. 2 is a block diagram showing, in greater detail, an exemplary interface between a system under test and an enhanced diagnostic fault detection and isolation system in accordance with the present invention.

FIG. 2 is a block diagram showing, in greater detail, an exemplary interface between a system under test and an enhanced diagnostic fault detection and isolation system in accordance with the present invention. In particular, an IETM 116 is connected via a link 114 to a UUT-IETM interface 202 of a UUT server 110. The UUT-IETM interface 202 is connected to three interfaces, interface 1 208, interface 2 206 and interface 3 204. Interface 1 208 is connected via a link 112 to an interface 210 in COTS subsystem 1 216. Interface 2 206 is connected via a link 112 to an interface 212 in COTS subsystem 2 218. Interface 3 204 is connected via a link 112 to an interface 214 in COTS subsystem 3 220.

In operation, the IETM 116 sends commands and receives responses via a link 114 to UUT-IETM interface 202. The UUT-IETM interface 202 routes the commands and responses to one of the three interfaces (204-208) according to the appropriate COTS subsystem (216-220) under test. Each interface (204-208) in the UUT server is connected to and configured according to the corresponding COTS interface (210-214) respectively.

The exemplary embodiment shown in FIG. 2 is for illustrative purposes only. It should be appreciated that the systems and methods of the present invention may be used in a variety of subsystem and interface configurations.

Figure 3:
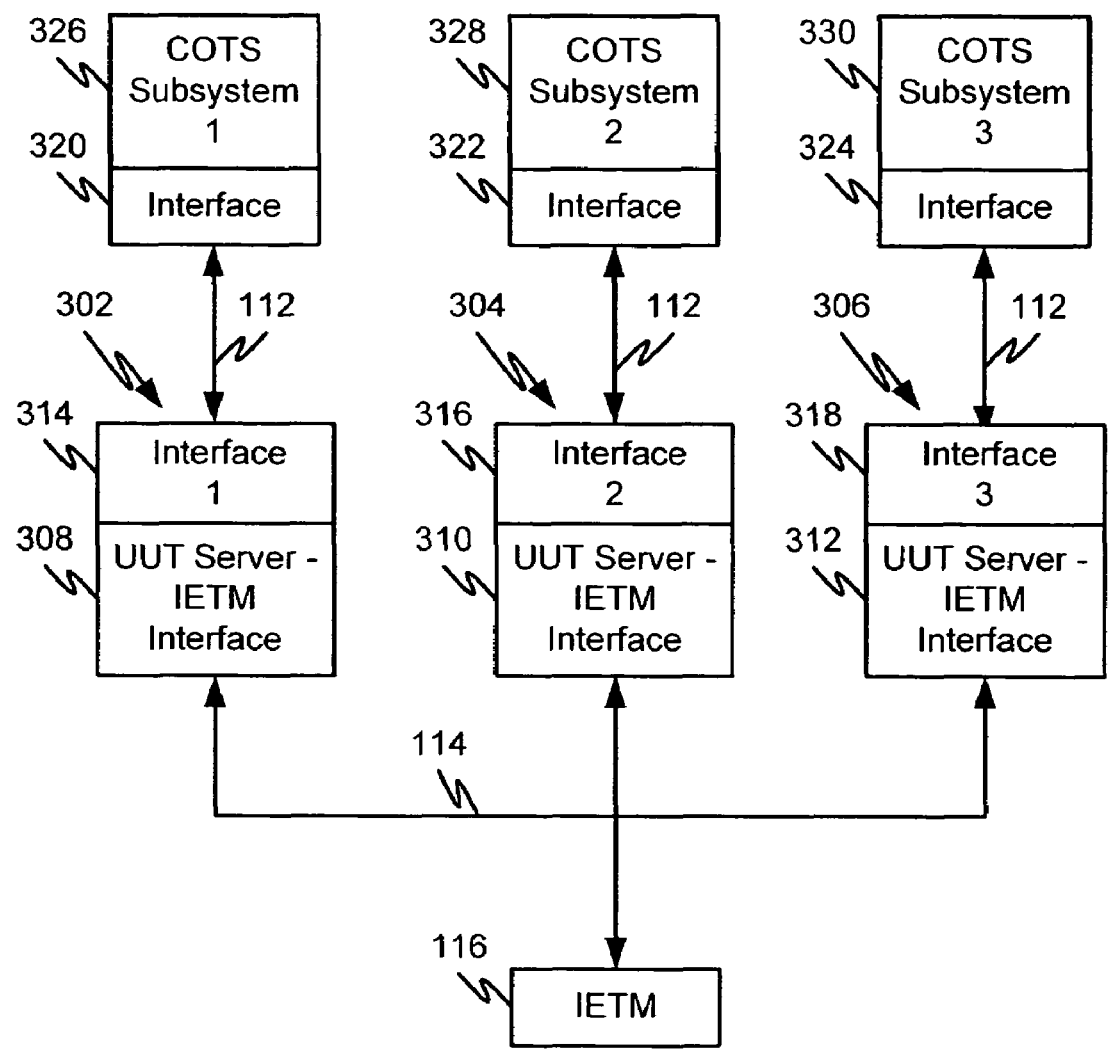
FIG. 3 is a block diagram showing, in greater detail, an exemplary interface between a system under test and an enhanced diagnostic fault detection and isolation system in accordance with the present invention.

As an alternative configuration, the UUT server may be unique for each subsystem. FIG. 3 is a block diagram showing, in greater detail, an exemplary interface between a system under test and an enhanced diagnostic fault detection and isolation system in accordance with the present invention, wherein the UUT server is unique for each subsystem. In particular, the IETM 116 is connected via links 114 to UUT server 1 302, UUT server 2 304 and UUT server 3 306. UUT server 1 302 comprises a UUT-IETM interface 308 and a subsystem interface 314. UUT server 2 304 comprises a UUT-IETM interface 310 and a subsystem interface 316. UUT server 3 306 comprises a UUT-IETM interface 312 and a subsystem interface 318. Each of the UUT server (302-306) subsystem interfaces (314-318) is connected via a link 112 to a respective COTS subsystem interface (320-324), which are in turn connected to a respective COTS subsystem (326-330).

In operation, the IETM 116 routes commands to the appropriate UUT server in accordance with the function being tested in the enhanced diagnostic fault detection and isolation test sequence. For example, when a test sequence requires a test command be sent to COTS subsystem 1 326, a test command is sent from the IETM 116 via a link 114 to the UUT-IETM interface 308 and then to the UUT server 302 subsystem interface 314. The UUT server 302 subsystem interface 314 sends the command via a link 112 to the COTS interface 320, which is coupled to the COTS subsystem 326.

Figure 4:
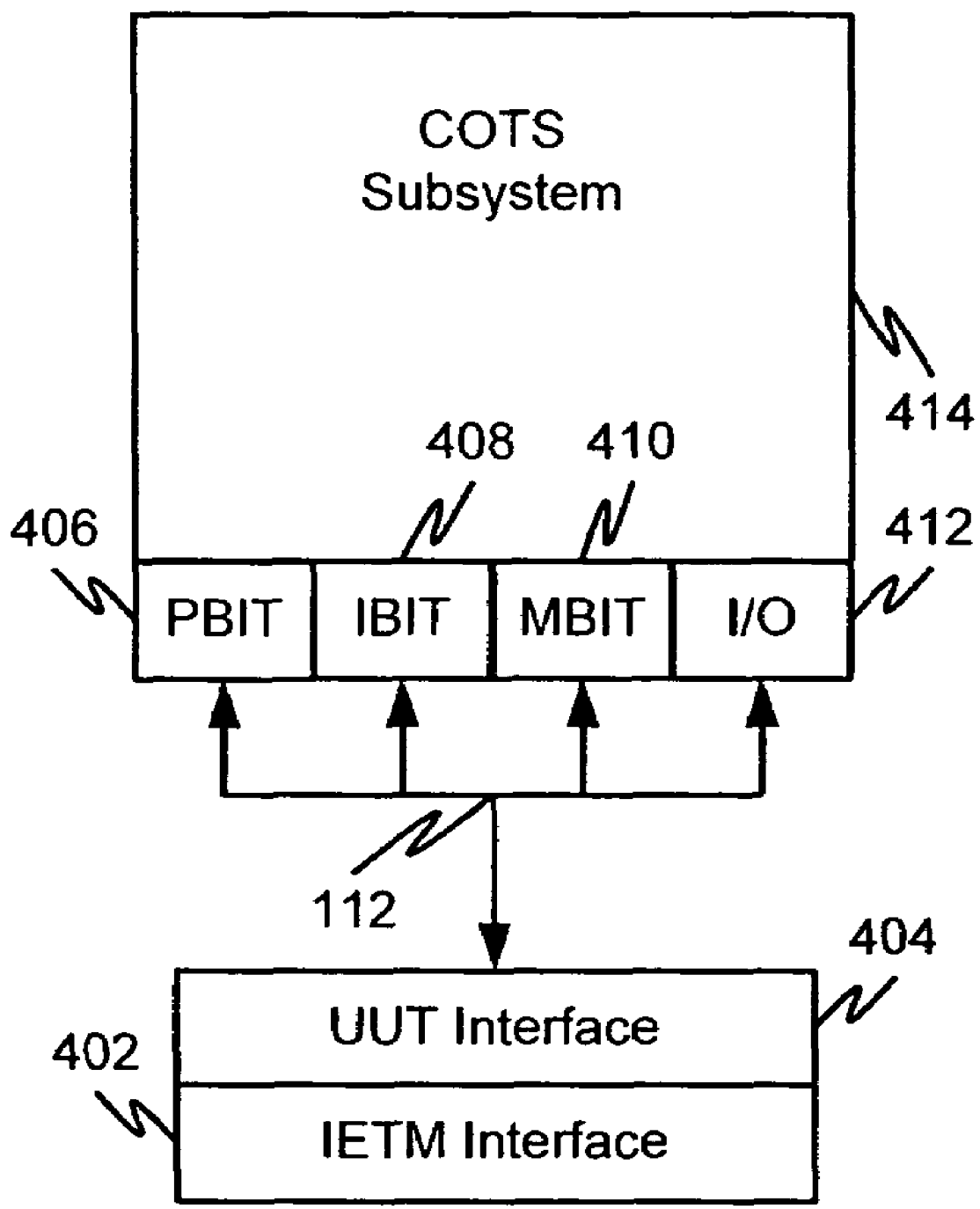
FIG. 4 is a block diagram showing the details of an exemplary interface between an exemplary embodiment of a Unit Under Test (UUT) server and an exemplary COTS component in accordance with the present invention.

FIG. 4 is a block diagram showing the details of an exemplary interface between an exemplary embodiment of a Unit Under Test (UUT) server and an exemplary COTS component in accordance with the present invention. In particular, an IETM interface 402 is coupled to a UUT interface 404. The UUT Interface 404 is coupled via links 112 to a periodic built in test (PBIT) element 406, an initiated built in test (IBIT) element 408, a manually initiated built in test (MBIT) element 410 and an I/O element 412 of COTS subsystem 414.

In operation, the UUT interface 404 issues commands and receives responses from the interface element (PBIT 406, IBIT 408, MBIT 410, or I/O 412) of COTS subsystem 414 that corresponding to commands received from the IETM (not shown) via the IETM interface 402.

Figure 5:
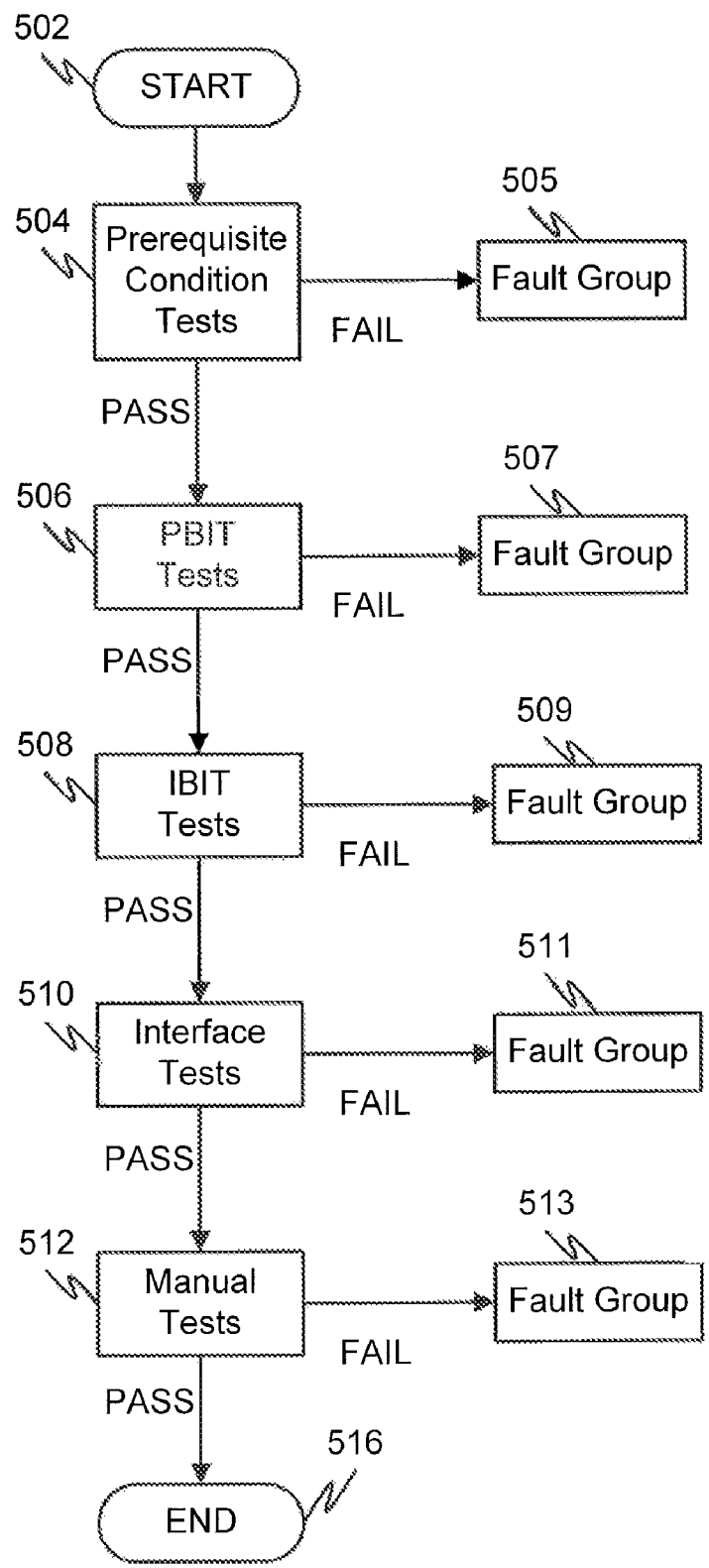
FIG. 5 is a flowchart showing an exemplary system-level enhanced diagnostic fault detection and isolation sequence in accordance with the present invention.

FIG. 5 is a flowchart showing an exemplary system-level enhanced diagnostic fault detection and isolation sequence in accordance with the present invention. In particular, control beings at step 502 and continues to step 504.

In step 504, prerequisite condition tests are performed. The prerequisite tests are selected based on physical hierarchy. Prerequisite tests are those tests that may be required to validate core functionality to the system before the UUT is diagnosed. Therefore, isolation may be performed if any prerequisite test fails. For example, in order to test a flight display, the prerequisite tests required may include the IETM to mission computer interface, the mission computer to communications bus interface, and the communications bus to flight display interface. Once all of the necessary prerequisite tests have passed, the test of the actual UUT can proceed. If a fault is found in the prerequisite condition test results, then control transfers to a fault group 505 for fault isolation and remove and replace indications. If no fault is found, control continues to step 506.

In step 506, PBIT is performed. PBIT is a non-operator initiated BIT that runs periodically in the background of a subsystem and is non-disruptive to the subsystem. If there are any faults detected in the PBIT results, then control transfers to a fault group 507 for fault isolation and remove and replace indications. If no fault is found, control continues to step 508.

In step 508, interface tests are performed. The interface test routines test the data communication between subsystems.

The interface tests do not require operator intervention. Two general types of faults may be detected in the interface tests, a fault that is beyond the subsystem being tested and a fault that is within the subsystem being tested. If a fault is detected that is beyond the subsystem being tested, the WRA interface test will return with an error code and a message indicating a new work order may be needed and what test needs to be performed. If a fault is detected in a WRA that is within the subsystem or wiring being tested, then control transfers to a fault group 509 for fault isolation and remove and replace indications. If no fault is detected, control continues to step 510.

In step 510, BIT tests are performed. The IBIT test task returns when IBIT is passed or skipped. If any faults are detected during IBIT, then the task ends and control transfers to a fault group 511 for fault isolation and remove and replace indications. If the IBIT tests pass, control continues to step 512.

In step 512, manual test tasks are performed. A manual test task will not return unless it is passed or is skipped by the operator. If a fault is detected during a manual test task, control transfers to a fault group 513 for fault isolation and remove and replace indications. If no faults are detected, control continues to step 516, where control terminates.

Figure 6:
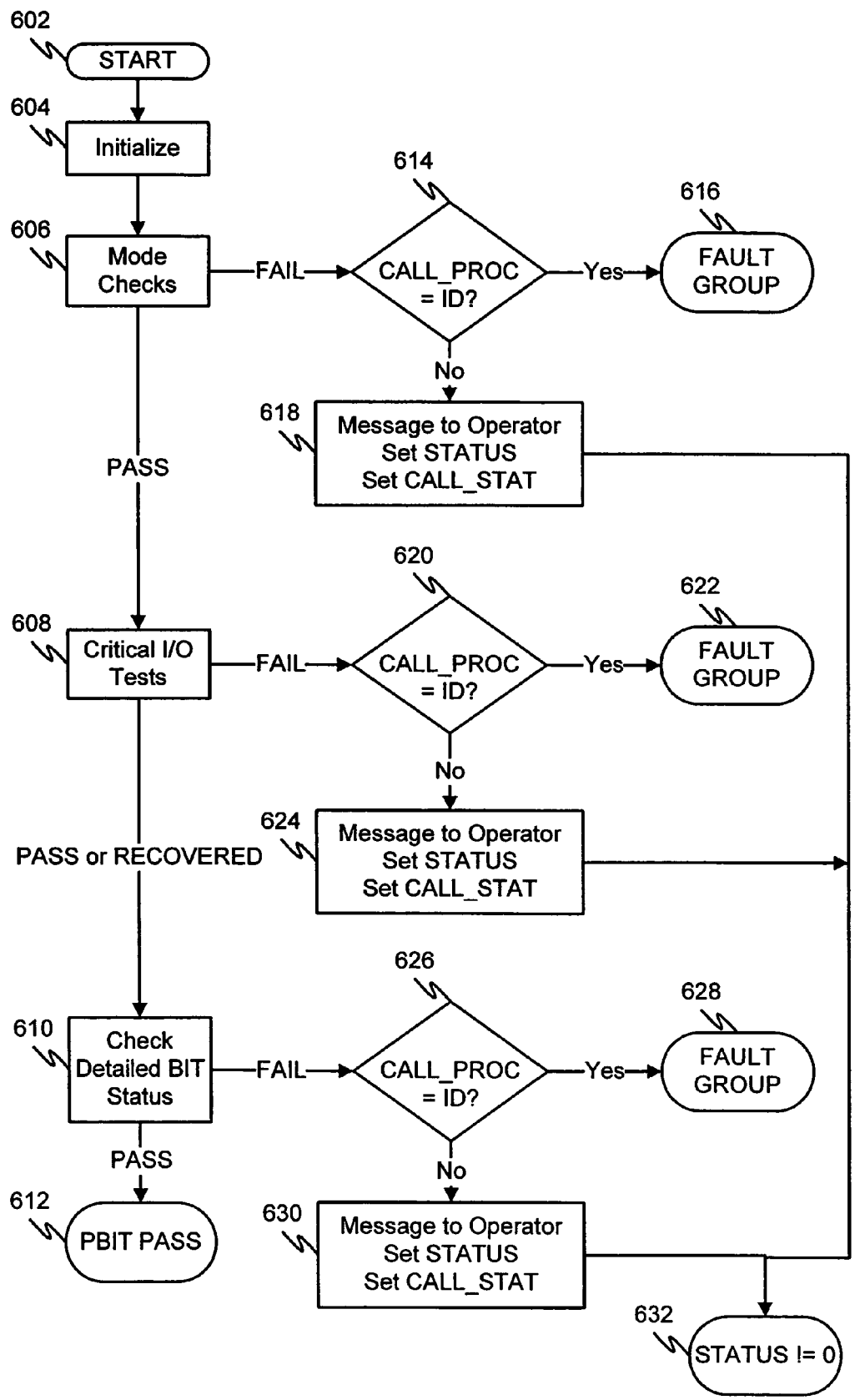
FIG. 6 is a flowchart showing an exemplary periodic built-in-test level enhanced diagnostic fault detection and isolation sequence in accordance with the present invention.

FIG. 6 is a flowchart showing an exemplary PBIT level fault detection and isolation sequence in accordance with the present invention. In particular, the subsystem PBIT task control begins in step 602. Control continues to step 604.

In step 604, the PBIT task initializes variables and data structures for performing PBIT. A command may be sent from the IETM to the UUT server requesting detailed device data for the subsystem. Once initialization is complete and no errors occurred, control transfers to step 606.

In step 606, mode checks are performed on the subsystem. If the subsystem is ready for PBIT, then control transfers to step 608. If the subsystem is not ready for PBIT, then control transfers to step 614. In step 614, the CALL_PROC variable is evaluated. If the CALL_PROC variable is equal to ID, a fault is indicated and must be isolated. Control transfers to step 616 for fault group links to mini-procedures to further isolate the fault. Otherwise, control transfers to step 618. In step 618, the STATUS and CALL_STAT variables are set and a message is displayed to the user if messaging is enabled. Control then transfers to step 632, where the task returns (terminates). The CALL_PROC variable may be used to determine WRA scope. If a task (other than a FLOW task) determines a failure, the fault group will only be displayed if the WRA is the same as the CALL_PROC scope. Otherwise, CALL_STAT is set to a failure message. CALL_STAT is the return status variable for tasks/subtasks other than the controlling FLOW task. CALL_STAT may be initialized in each task to a null string and set to a failure message for exit conditions. Test tasks including PBIT, IBIT, and interface tests, may initialize CALL_STAT to null since it is a global variable. If DISPLAY_MSG is true a message is also displayed to the maintainer before testing is returned to the calling task (usually the FLOW task). DISPLAY_MSG is a variable used to trigger a display message if a fault is OUT OF SCOPE. If DISPLAY_MSG contains a non-zero value the message will be displayed. Otherwise, the no message will be displayed.

In step 608, critical Input/Output (I/O) tests are performed. If a fault is detected in the critical I/O tests, operator intervention mini-procedures may be indicated. The operator intervention mini-procedures may include circuit breaker, power switch, power cable, wire isolation, cooling fan, ETI, video, probe voltage test, bus address, configuration pin checks and/or the like. The operator intervention mini-procedures are designed to eliminate obvious sources of critical I/O faults. If the operator-intervention mini-procedures do not correct the problem and a fault still exists after performing the critical I/O test, then control transfers to step 620. If no errors are detected in the critical I/O tests, then control transfers to step 610.

In step 620, the CALL_PROC variable is evaluated. If the CALL_PROC variable is equal to ID, a fault is indicated and must be isolated. Control transfers to step 622 where the fault group further isolates the fault and remove and replace indications may be provided. If the CALL_PROC variable does not equal the ID variable control transfer to step 624. In step 624, the STATUS and CALL_STAT variables are set, and a message is generated for the user if messaging is enabled. Control then transfers to step 632, where the task returns (terminates).

In step 610, the detailed BIT status is checked in a hierarchical sequence based on IBA information to detect faults. Any BIT detected fault is isolated. The faults are mapped to a WRA or a list of candidate WRAs. If the fault that was detected is indeterminate, then the IETM generates an error. If errors were detected in the detailed BIT status check, then control transfers to step 626. In step 626, the CALL_PROC variable is evaluated. If the CALL_PROC variable is equal to ID, a fault is indicated and must be isolated. Control transfers to step 628 where the fault group further isolates the fault and remove and replace indications may be provided. If the CALL_PROC variable does not equal the ID variable control transfers to step 630. In step 630, the STATUS and CALL_STAT variables are set, and a message is generated for the user if messaging is enabled. Control then transfers to step 632, where the task returns (terminates). If no faults were detected in step 610, control transfers to step 612. In step 612, the PBIT tasks returns control to the calling function.

Figure 7:
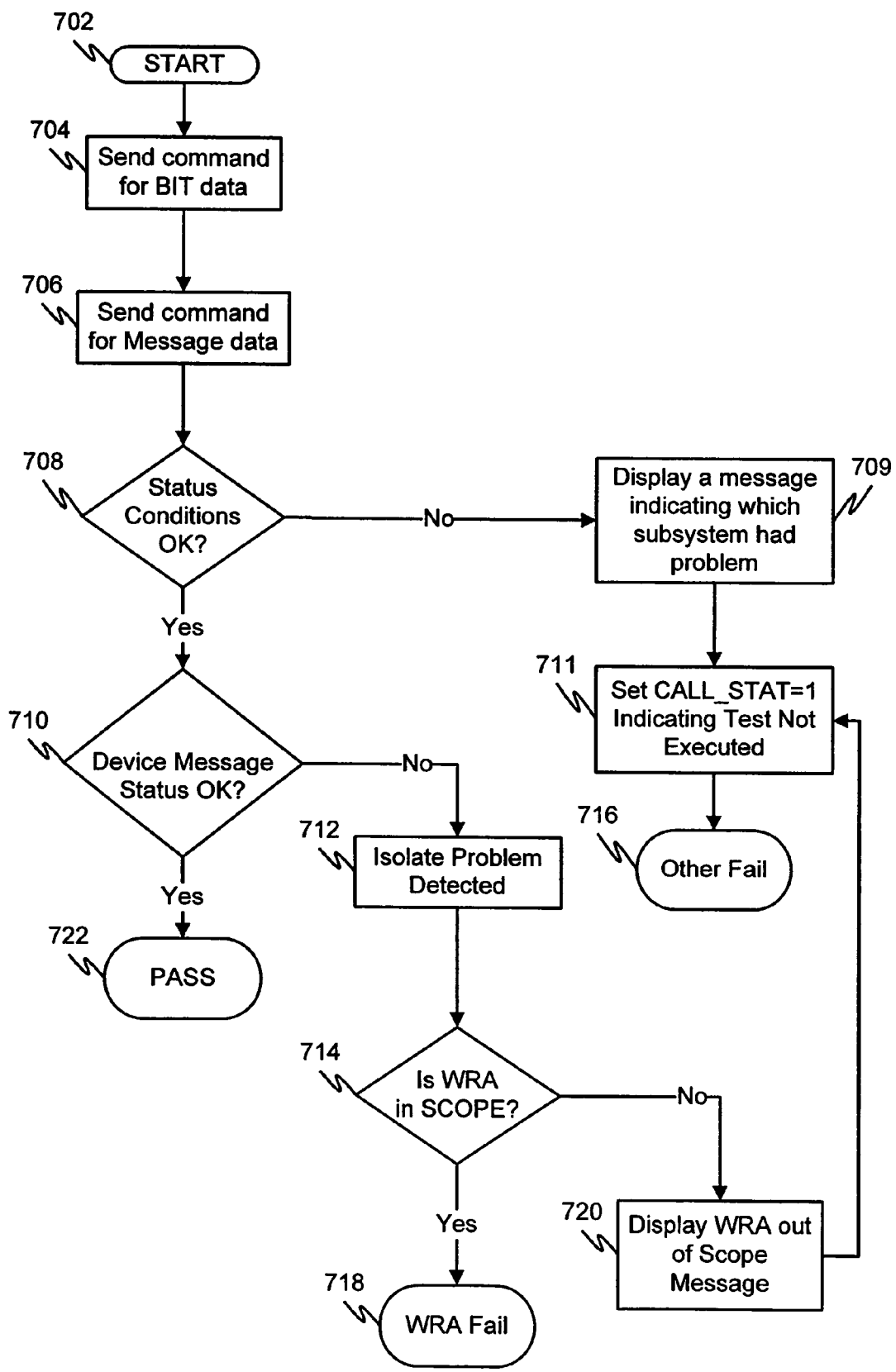
FIG. 7 is a flowchart showing an exemplary message interface fault detection and isolation sequence in accordance with the present invention.

FIG. 7 is a flowchart showing an exemplary interface fault detection and isolation sequence in accordance with the present invention. In particular, control begins in step 702 and transfers to step 704.

In step 704, variables and data structures are initialized and a command for BIT data is sent to the subsystem. Control then continues to step 706.

In step 706, a command requesting message data is sent to the subsystem. Control continues to step 708.

In step 708, status conditions on the tests for each subsystem are checked. If the status conditions indicate a fault, then control continues to step 709. If the status conditions indicate that no faults occurred then control continues to step 710.

In step 709, a message is displayed to the operator listing each faulty subsystem. The operator can then perform tests on the faulty subsystems or open a new work order for replacement of a WRA if the fault was isolated to a specific WRA. Control then transfers to step 711, in which a variable is set indicating that the interface tests did not execute and a variable is set indicating the reason for the task terminating. Control then continues to step 716, where the sequence terminates.

In step 710, the device message status is checked. If the device message status indicates no faults, a variable is set indicating successful completion of the test and control continues to step 722, where the sequence terminates. However, if the device message status indicates faults in the message interface tests then control continues to step 712.

In step 712, any detected faults are isolated to a single WRA or a list of candidate WRAs. Control continues to step 714.

In step 714, the WRA list is evaluated to determine whether the list is in scope based on the CALL_PROC variable. If the WRA list is within scope, control continues to step 718. If the WRA list is not within scope control continues to step 720.

In step 718, the WRA failure is linked to remove and replace procedures and the interface test task sequence terminates.

In step 720, a message indicating that the WRA is out of scope is displayed to the operator. The message may inform the operator that no further interface testing was performed and that a new work order may need to be created to replace the faulty WRA. A variable is set indicating that the interface tests did not execute. Control then transfers to step 711, in which a variable is set indicating that the interface tests did not execute and a variable is set indicating the reason for the task terminating. Control then continues to step 716, where the sequence terminates.

Figure 8:
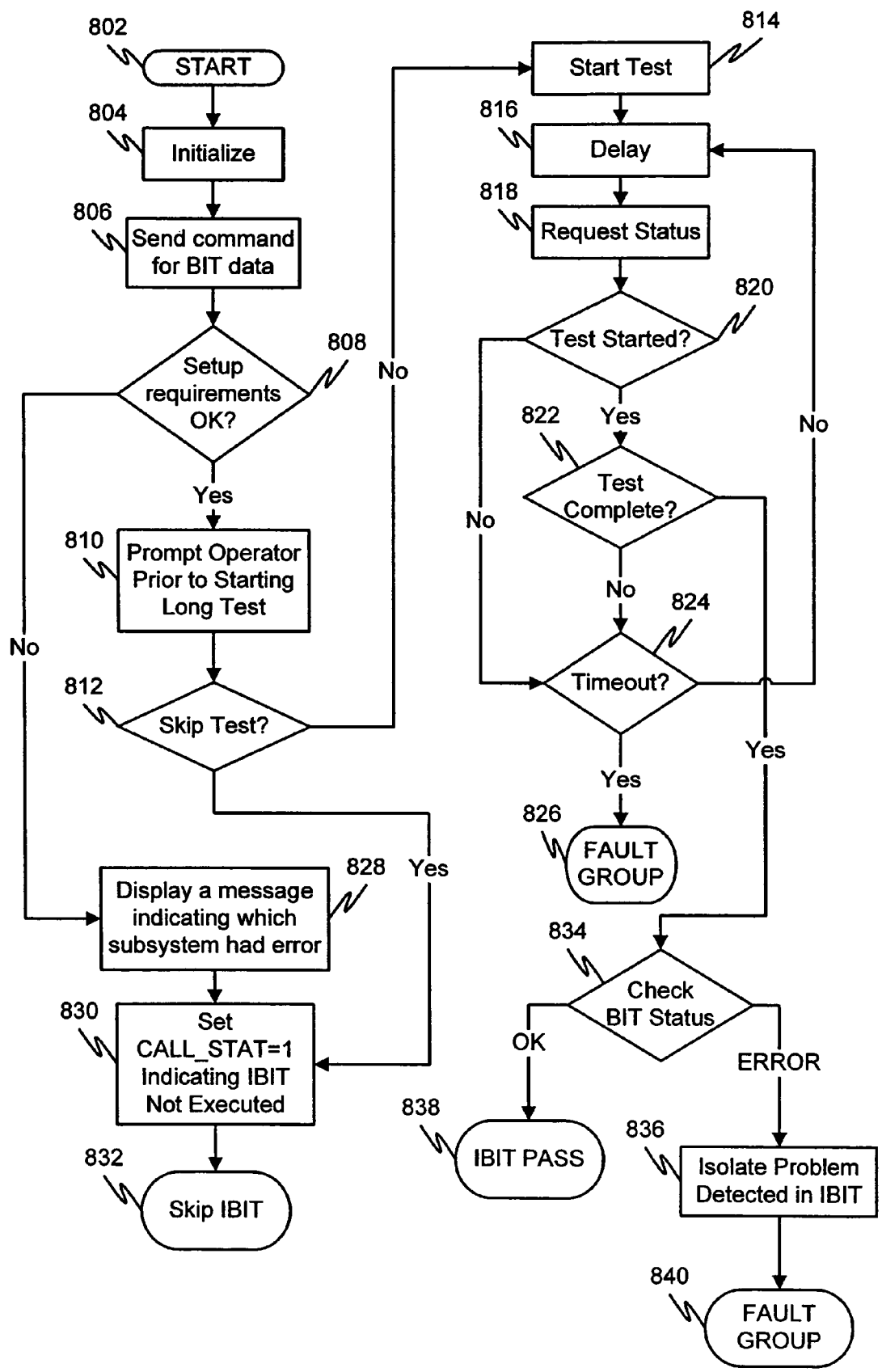
FIG. 8 is a flowchart showing an exemplary initiated built-in-test fault detection and isolation sequence in accordance with the present invention.

FIG. 8 is a flowchart showing an exemplary initiated built-in-test fault detection and isolation sequence in accordance with the present invention. In particular, control begins in step 802 and continues to step 804.

In step 804, variables and data structures that may be used in the initiated BIT test are initialized. For example, the CALL_STAT variable is set to a value of 0 indicating PASS. CALL_STAT is the return status for all tasks/subtasks other than the controlling FLOW tasks. CALL_STAT should be initialized in each task to a null string and set to a failure message for all exit conditions. All test tasks, for example PBIT, IBIT, and interface tests, should initialize CALL_STAT to null since this is a global variable. Upon detection of a failure, CALL_STAT is set such as "Pilot Flight Display Critical FAIL" before any exception processing occurs. This variable is only utilized when a fault is detected and the IETM fails to report the fault. The enhanced diagnostic fault detection and isolation system has the capability to capture non-detects and CALL_STAT is the variable used to report to the task that was executing when the problem was detected. Control then continues to step 806.

In step 806, a command is sent to the subsystem under test requesting BIT data. Detailed device data is also gathered. Control continues to step 808.

In step 808, the setup requirements for the test are checked. If the setup requirements are not properly met, control continues to step 828. If the setup conditions are properly met, control continues to step 810.

In step 828, a message is displayed to the operator listing the subsystem where the setup problem occurred. The operator can then initiate a test of the faulty subsystem. Control then continues to step 830.

In step 830, a variable is set to a value indicating that initiated BIT did not execute. Another variable is set indicating that IBIT testing is incomplete and the IBIT task is skipped. Control continues to step 832, where the IBIT control sequence terminates.

In step 810, if the test is lengthy, such as for example taking more than one minute to complete, a dialog message is displayed to an operator providing the operator with an opportunity to skip the test. The operator must provided input indicating whether to continue with the test or skip the test. Control continues to step 812, where the response from the operator is evaluated. If the operator has elected to skip the test control continues to step 830 (described above), otherwise if the operator has elected to continue with the test control continues to step 814.

In step 814, a command is sent to start the test. Control continues to step 816.

In step 816, a delay loop is set up to wait while the IBIT test is being performed. Control continues to step 818. In step 818, a command is sent to get the status of the IBIT test. Control continues to step 820.

In step 820, the status of the IBIT test is evaluated. If the test has started control continues to step 822, otherwise control continues to step 824.

In step 822, the IBIT test status is evaluated. If the status indicates that the IBIT test is complete control continues to step 834, otherwise, control continues to step 824.

In step 824, the IBIT test timeout is checked. A timeout value is used to prevent the IBIT test task from "hanging" if the IBIT does not complete for any reason. If the timeout has been reached, control continues to step 826, otherwise, control continues to step 816 (described above).

In step 826, the IBIT test task sequence terminates and control continues to a fault group which links to mini-procedures for evaluating the cause for the IBIT timeout occurring.

In step 834, the detailed BIT status is checked in a hierarchical sequence to detect failures. If failures have occurred, control continues to step 836, otherwise control continues to step 838.

In step 836, an attempt is made to isolate the faults detected during IBIT. The faults are mapped to a single WRA or a list of candidate WRAs. Interface conditions are checked if required, because external conditions can cause BIT failures in certain cases. Control continues to step 840. In step 840, the IBIT test task sequence terminates and control continues to a fault group, which links to remove and replace procedures for the WRAs identified as faulty.

In step 838, a variable is set to a value indicating successful completion of the IBIT test task sequence and the IBIT test task sequence terminates.

Figure 9:
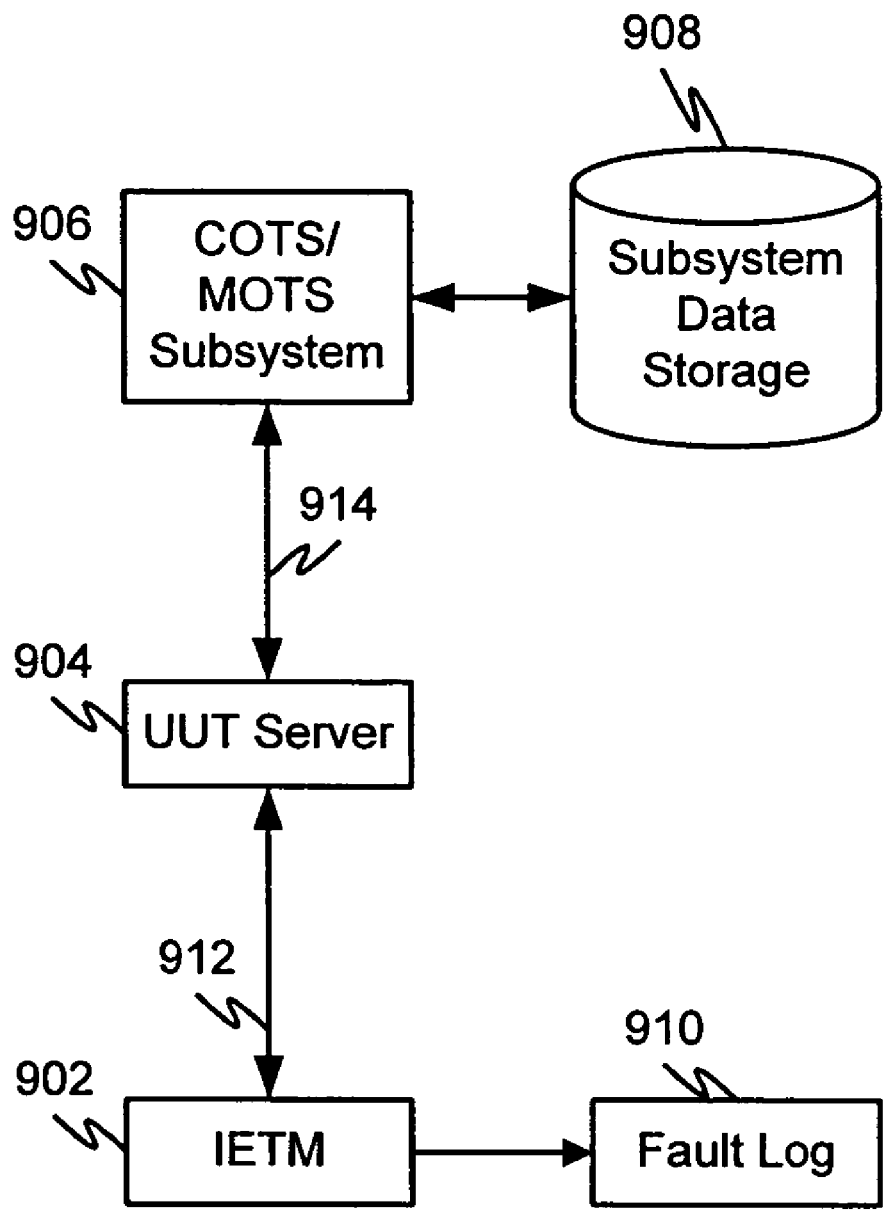
FIG. 9 is a block diagram of an exemplary embodiment of a fault detection and isolation system in accordance with the present invention.

FIG. 9 shows a block diagram of a system for fault detection and isolation in accordance with the present invention. In particular, the fault detection and isolation system 90 comprises an IETM 902, a UUT server 904, one or more COTS/MOTS subsystems 906, a subsystem data storage device 908 and a fault log 910. The IETM 902 is connected via a link 912 to the UUT server 904. The UUT server 904 is connected via a link 914 to the COTS/MOTS subsystem 906. The COTS/MOTS subsystem 906 is coupled to the subsystem data storage device 908.

In operation, the IETM 902 performs a fault detection and isolation task sequence on the COTS/MOTS subsystem 906. The IETM 902 generates an intermediate listing of faults detected and stores this list in the IETM memory (not shown). The IETM 902 then requests any fault data stored by the COTS/MOTS subsystem 906 in the subsystem data storage device 908. The data received from the COTS/MOTS subsystem 906 is used to augment the intermediate listing of faults stored in the IETM memory (not shown). The intermediate listing of faults is then used by the IETM 902 to generate a fault log 910. The records in the fault log 910 can be sorted and arranged according to a variety of criteria, including, for example, time of occurrence, error code, error type, subsystems affected and/or WRAs affected.

The IETM 902 can then transform the fault log 910 into a look-up table structure. The look-up table structure provides the user with a presentation of the fault log 910 that may be easier to interpret.

In generating the fault log 910 and look-up table structure, the IETM 902 may convert BIT codes, which represent WRA and/or subsystem status into text messages that may be more easily understood by a user of the system.

The IETM 902 enhanced diagnostic fault detection and isolation task is configured to provide a time-based filter function. The filter function allows the user of the IETM 902 to specify time ranges or ordering of fault occurrences so that a user may be able to ascertain when a fault occurred in relation to other events occurring in the system and/or subsystem. This capability may be particularly useful in troubleshooting an intermittent event or correlating a fault with another seemingly unrelated system or subsystem event.

Figure 10:
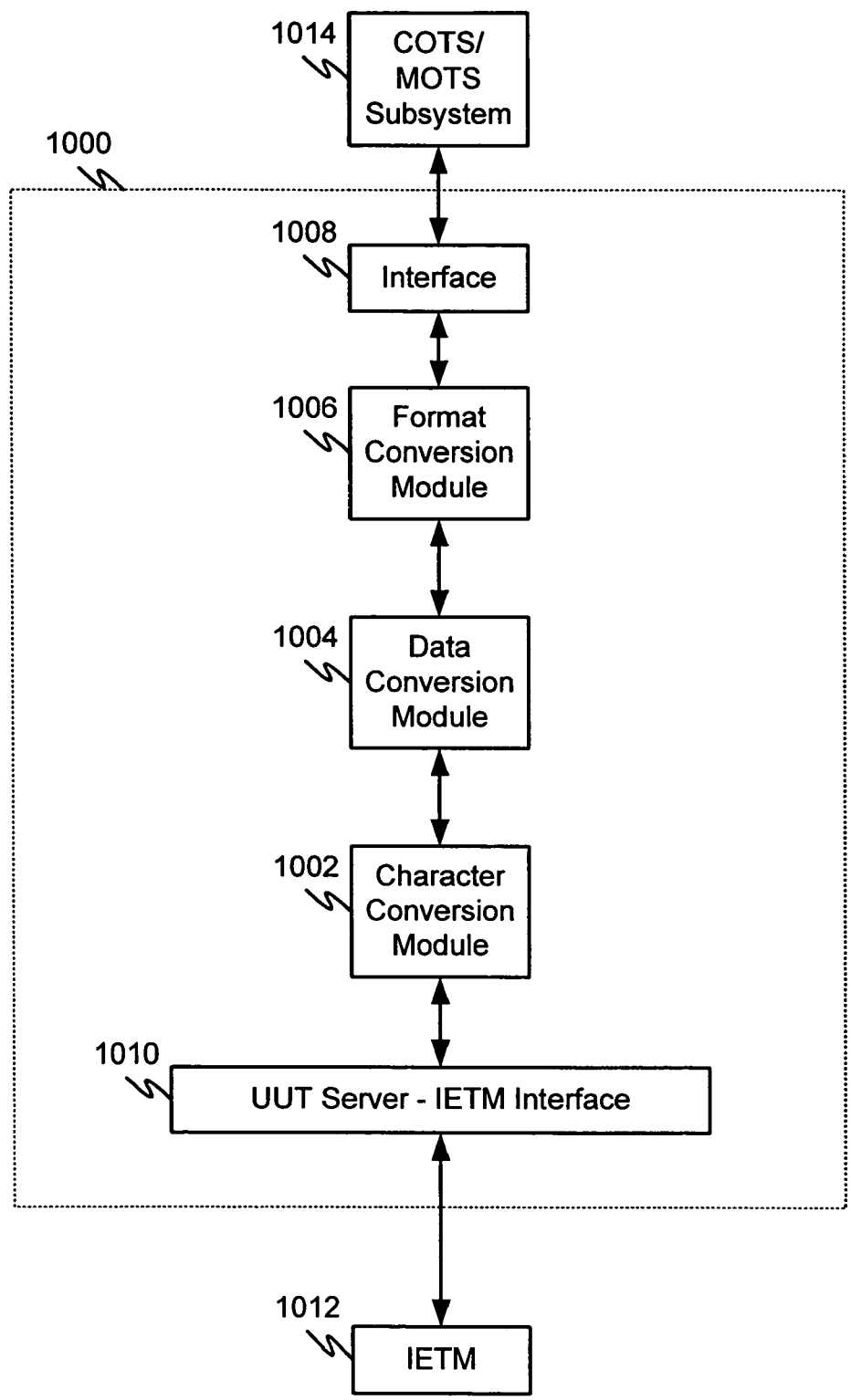
FIG. 10 is a block diagram of an exemplary embodiment of a UUT server in accordance with the present invention.

FIG. 10 shows a more detailed view of an exemplary embodiment of a UUT server in accordance with the present invention. In particular the UUT server 1000 comprises a format conversion module 1006, a data conversion module 1004 and a character conversion module 1002. The UUT server 1000 further comprises a first bi-directional data transfer node 1008 for communicating with the COTS/MOTS subsystem 1014 and a second bidirectional data transfer node 1010 for communicating with the IETM 1012. The bidirectional data transfer nodes (1008 and 1010) may be serial or parallel interfaces employing various protocols, such as, for example, RS232, RS422, USB, IEEE 1391, Ethernet and/or the like. Further, the bi-directional data transfer nodes (1008 and 1010) may be wired or wireless nodes.

In operation, commands may be sent from the IETM 1012 to the UUT server 1000. The character conversion module 1002 processes the commands in order to map the characters of the IETM 1012 to the corresponding characters of the COTS/MOTS subsystem under test 1014. Next, the data conversion module 1004 processes the command. The data conversion module 1004 converts the data format of the command from the IETM format into the appropriate format for the COTS/MOTS subsystem under test 1014. The format conversion module 1006 then processes the command. The format conversion module 1006 converts and/or adapts the format of the IETM command to the appropriate format for transmitting to the COTS/MOTS subsystem under test 1014.

Figure 11:
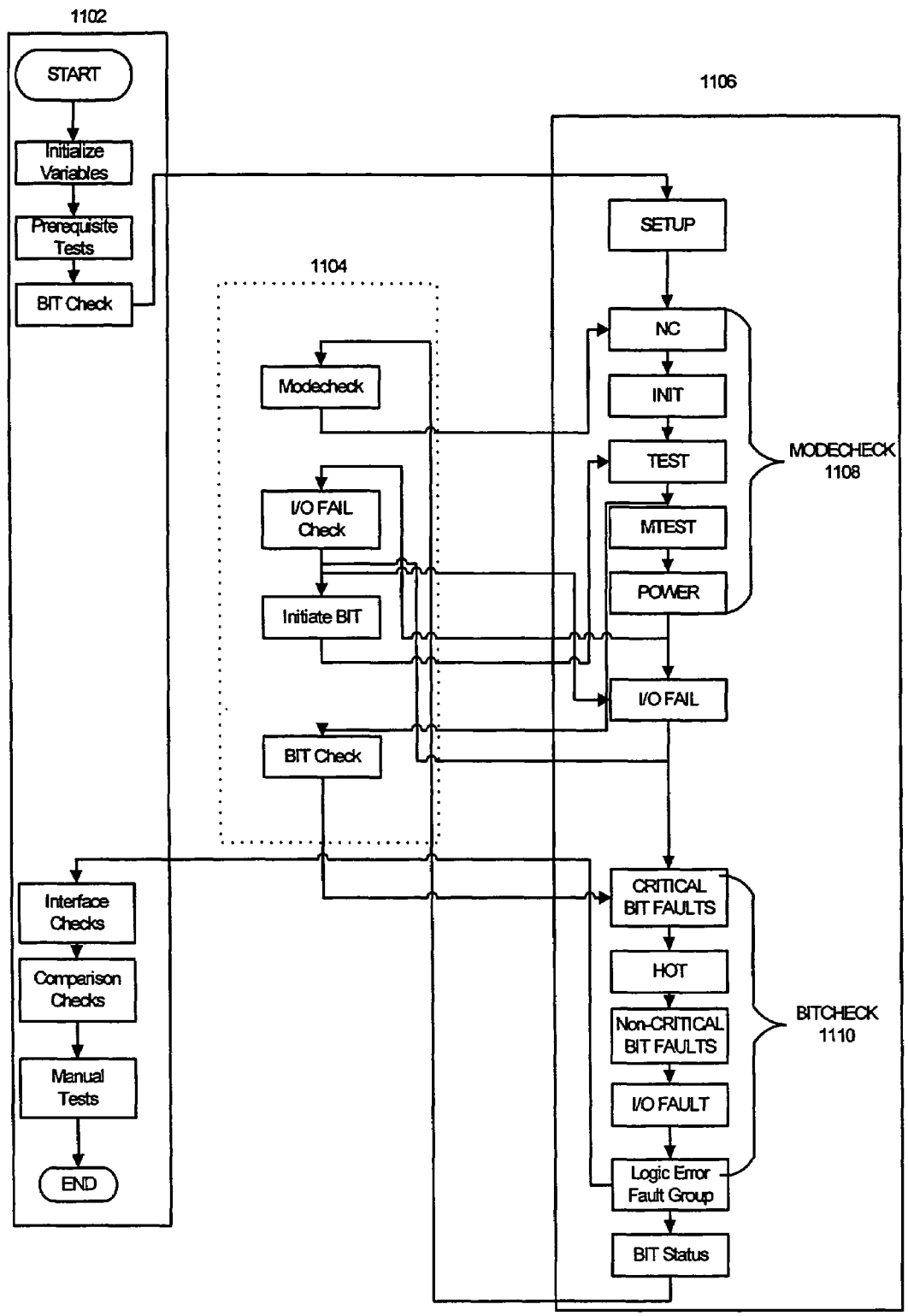
FIG. 11 shows a flowchart of an exemplary flow test task and its associated relationship to an IBIT test task and a PBIT test task.

FIG. 11 shows a flowchart of an exemplary flow test task and its associated relationship to an IBIT test task and a PBIT test task. In particular, a flow task 1102 is shown branching to a PBIT task 1106 at the time of BIT testing in the flow task 1102. The PBIT task is comprised of mode checks 1108 and BIT checks 1110. The PBIT task branches to an IBIT task 1104 at various points throughout the PBIT test task 1106. The PBIT test task 1106 also branches back to the flow test task 1102.

Figure 12:
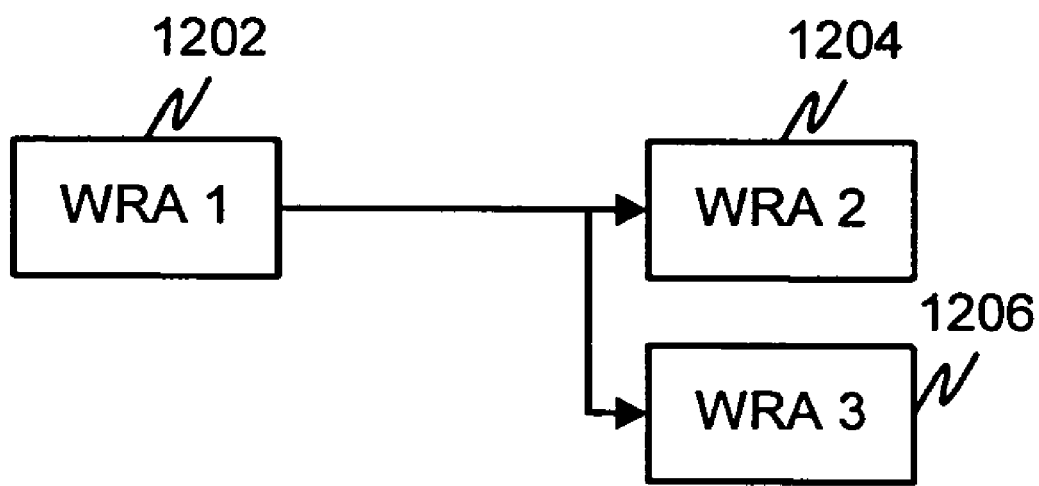
FIG. 12 is a diagram of an exemplary system with three WRAs coupled to each other.

FIG. 12 shows an exemplary system with three WRAs coupled to each other. In particular, WRA 1 1202 is coupled to WRA 2 1204 and WRA 3 1206.

In operation, there may be a plurality of possible states that can exist for the exemplary interface arrangement shown in FIG. 12. Several exemplary states are described below along with corresponding messages from an IETM according to the present invention to a maintenance technician.

In an exemplary embodiment of the present invention, a variable, DISPLAY_MSG, controls the level of messaging that is used to display messages to the maintenance technician. For example, if DISPLAY_MSG is set to 0, or none, no messages will be displayed. This level is typically not selectable by a user. However, it can be set programmatically to run tests in the silent mode.

If DISPLAY_MSG is set to 1, or critical only, only critical messages will be displayed. Critical messages are those that impact testing for those tests that are executed where CALL_PROC does not equal ID, including tests that take longer than 15 seconds (INIT, TEST, etc. ... ). Critical messages may be displayed in blue and if a timeout occurs, the resulting message may be displayed in red. For tests that impact execution (NC, MTEST), messages will be displayed in red.

If DISPLAY_MSG is set to a value of 2, or fault, flow and fault messages will be displayed. Flow messaging will be displayed to provide maintainer insight into what tests are being executed. Fault messages are those messages that effect testing or tests that fail but do not result in a Fault Group such as (EGI1 Critical I/O Fault Detected). All Fault Messages may be displayed in red.

If the message reports a subsystem failed such as (EGI BIT Check—FAILED). The word "FAILED" may appear in uppercase and emphasized.

If the message contains mixed information such as the following: "EG12 Interface Test to Pilot Flight Display Passes. Interface test to Copilot Flight Display cannot be validated, Copilot Flight Display did not pass PBIT." Pass information may be displayed in blue and fault information may be displayed in red and data indicating why a fault occurred may be underlined.

If DISPLAY_MSG is set to a value of 3, or all, all messages are displayed. This also pertains to Bit Display Tables. Messaging should provide what test is being executed and corresponding result. Pass messages may be displayed in green and fail/fault messages may be displayed in red.

In a first exemplary state, all WRAs pass PBIT. The interface between WRA 1 1202 and WRA 2 1204 and WRA 3 1206 pass. The IETM may display a message that reads, for example, "WRA 1 Interface to WRA 2 and WRA 3—Pass."

In a second exemplary state, an interface test to WRA2 1204 passes and an interface test to WRA3 1206 fails. The IETM may display a message that reads, for example, "WRA1 interface to WRA2 passed. Interface to WRA3 failed. Probable cause is interface wiring between splice and WRA3. R/R: Interface wiring from splice to WRA3, WRA3."

In a third exemplary state, an interface test to WRA2 1204 fails and interface test to WRA3 1206 passes. The IETM may display a message that reads, for example, "WRA1 interface to WRA3 passed. Interface to WRA2 failed. Probable cause is interface wiring between splice and WRA2. R/R: Interface wiring from splice to WRA2, WRA2."

In a fourth exemplary state, an interface test to WRA2 1204 fails and an interface test to WRA3 1206 fails. The IETM may display a message that reads, for example, "WRA1 interface to WRA2 & WRA3 failed. Probable cause is interface wiring between WRA1 and WRA2 & WRA3. R/R: WRA1 interface to WRA2 & WRA3, WRA1, WRA2, & WRA3 (WRA2 & WRA3 low probability)."

In a fifth exemplary state, WRA1 1202 and WRA2 1204 pass PBIT, and WRA3 1206 fails PBIT. In this state, the interface test from WRA1 to WRA3 may be a don't care since the validity of the interface cannot be validated due to WRA3 1206 failing PBIT.

In a sixth exemplary state, an interface test to FDP passes. The IETM may display a message that reads, for example, "WRA1 interface Test to WRA2 Passes. Interface test to WRA3 cannot be validated, WRA3 did not pass PBIT. Run WRA3 diagnostics to isolate."

In a seventh exemplary state, an interface test to WRA2 Fails. The IETM may display a message that reads, for example, "WRA1 interface Test to WRA2 Failed. Interface test to WRA3 cannot be validated, WRA3 did not pass PBIT. Run WRA3 diagnostics to isolate."

In an eighth exemplary state, an interface test to WRA3 passes. The IETM may display a message that reads, for example, "WRA1 interface Test to WRA3 Passes. Interface test to WRA2 cannot be validated, WRA2 did not pass PBIT. Run WRA2 diagnostics to isolate."

In a ninth exemplary state, an interface test to WRA3 Fails. The IETM may display a message that reads, for example, "WRA1 interface Test to WRA3 Failed. Interface test to WRA2 cannot be validated, WRA2 did not pass PBIT. Run WRA2 diagnostics to isolate."

The last 2 variables are dependent upon the calling procedure (WRA1 1202 verses one of the other WRAs (WRA2 1204 or WRA3 1206). This is because the WRA1 1202 is the source and communicates to both WRA2 1204 and WRA3 1206 where WRA2 1204 and WRA3 1206 can only receive eliminating the interface between WRA2 1204 and WRA 3 1206.

For example, the CALL_PROC variable is set to WRA1. Both WRA2 1204 and WRA3 1206 fail PBIT. In this case, the interface test from WRA1 to WRA2 and WRA 3 may be a "don't care" since the validity of the interface cannot be validated due to WRA2 & WRA3 failing PBIT.

In a tenth exemplary state, an interface test to WRA2 1204 fails and an interface test to WRA3 1206 fails. The IETM may display a message that reads, for example, "Interface test to WRA2 cannot be validated, WRA2 did not pass PBIT. Run WRA2 diagnostics to isolate. Interface test to WRA3 cannot be validated, WRA3 did not pass PBIT. Run WRA3 diagnostics to isolate."

In another example, the CALL_PROC is set to WRA2/WRA3. WRA1 1202 fails PBIT and WRA2 1204 and WRA3 1206 pass PBIT. In this case, the interface test from WRA1 1202 may be a don't care since the validity of the interface cannot be validated due to WRA1 1202 failing PBIT because WRA1 1202 is the source of the signal.

In an eleventh exemplary state, WRA1 1202 Fails PBIT. The IETM may display a message that reads, for example, "Interface test to WRA1 cannot be validated, WRA1 did not pass PBIT. Run WRA1 diagnostics to isolate."

Figure 13:
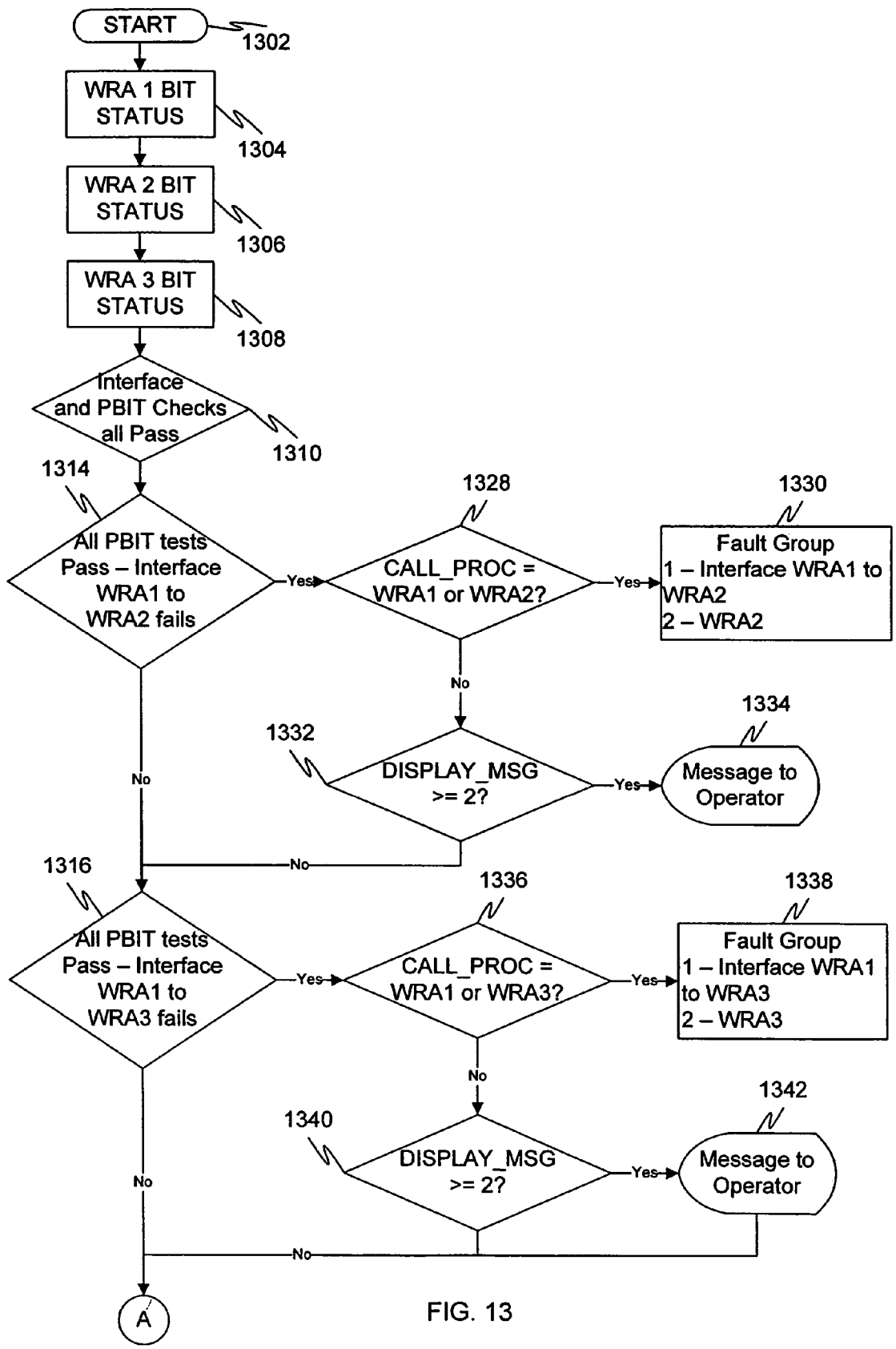
FIG. 13 is a flowchart of an exemplary diagnostic test flow sequence for the system shown in FIG. 12.

FIG. 13 is a flowchart of an exemplary diagnostic test flow sequence for the system shown in FIG. 12. In particular, control begins at step 1302 and continues to step 1304. In step 1304, PBIT is executed on WRA 1. Control then continues to step 1306. In step 1306, PBIT is executed on WRA 2. Control then continues to step 1308. In step 1308, PBIT is executed on WRA 3. Control then continues to step 1310.

In step 1310, the PBIT results and interface test results for WRA 1, WRA 2 and WRA 3 are evaluated. If the interface test and PBIT tests all pass, then control continues to step 1312, where a message is displayed to the operator that the WRA 1 interface to WRA 2 and WRA 3 passed interface test and PBIT tests. Control then continues to step 1314.

In step 1314, if the PBIT tests passed, but the interface form WRA 1 to WRA 2 fails, the control continues to step 1328, otherwise, control continues to step 1316.

Figure 14:
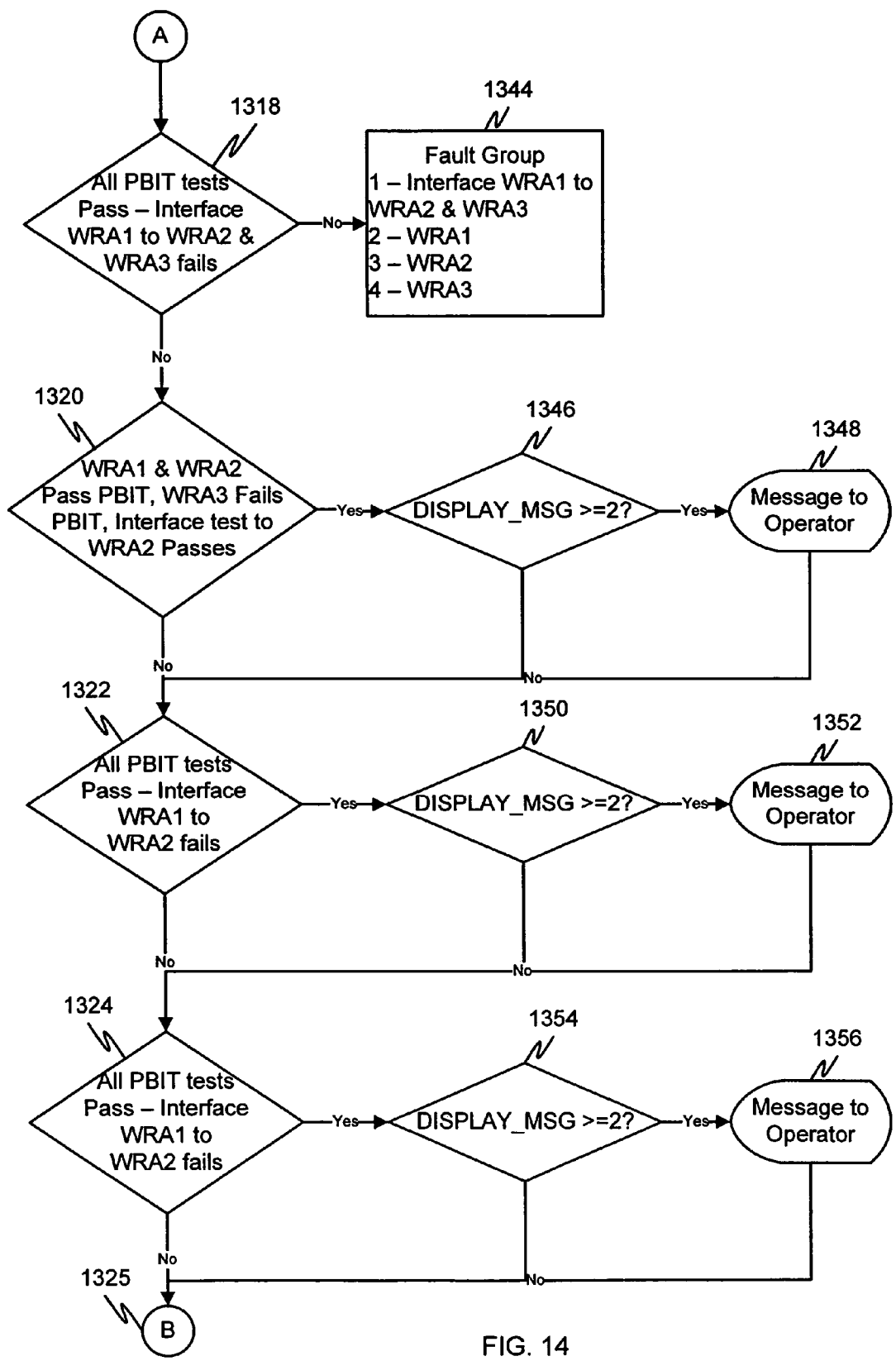
FIG. 14 is a flowchart of a continuation of the exemplary diagnostic test flow sequence of FIG. 13.

In step 1316, if the PBIT tests pass, but the interface from WRA 1 to WRA 3 fails, control continues to step 1336, otherwise control continues to step 1318 shown in FIG. 14.

In step 1318, if the PBIT tests passed, but the interface from WRA1 to WRA2 and WRA3 fails, control continues to step 1344, otherwise, control continues to step 1320.

In step 1320, if WRA 1 and WRA 2 pass PBIT, but WRA 3 fails PBIT and the interface from WRA 1 to WRA 2 passes, control continues to step 1346, otherwise, control continues to step 1322.

In step 1322, if WRA 1 and WRA 2 pass PBIT, but WRA 3 fails PBIT and the interface form WRA 1 to WRA 2 fails, then control continues to step 1350, otherwise, control continues to step 1324.

Figure 15:
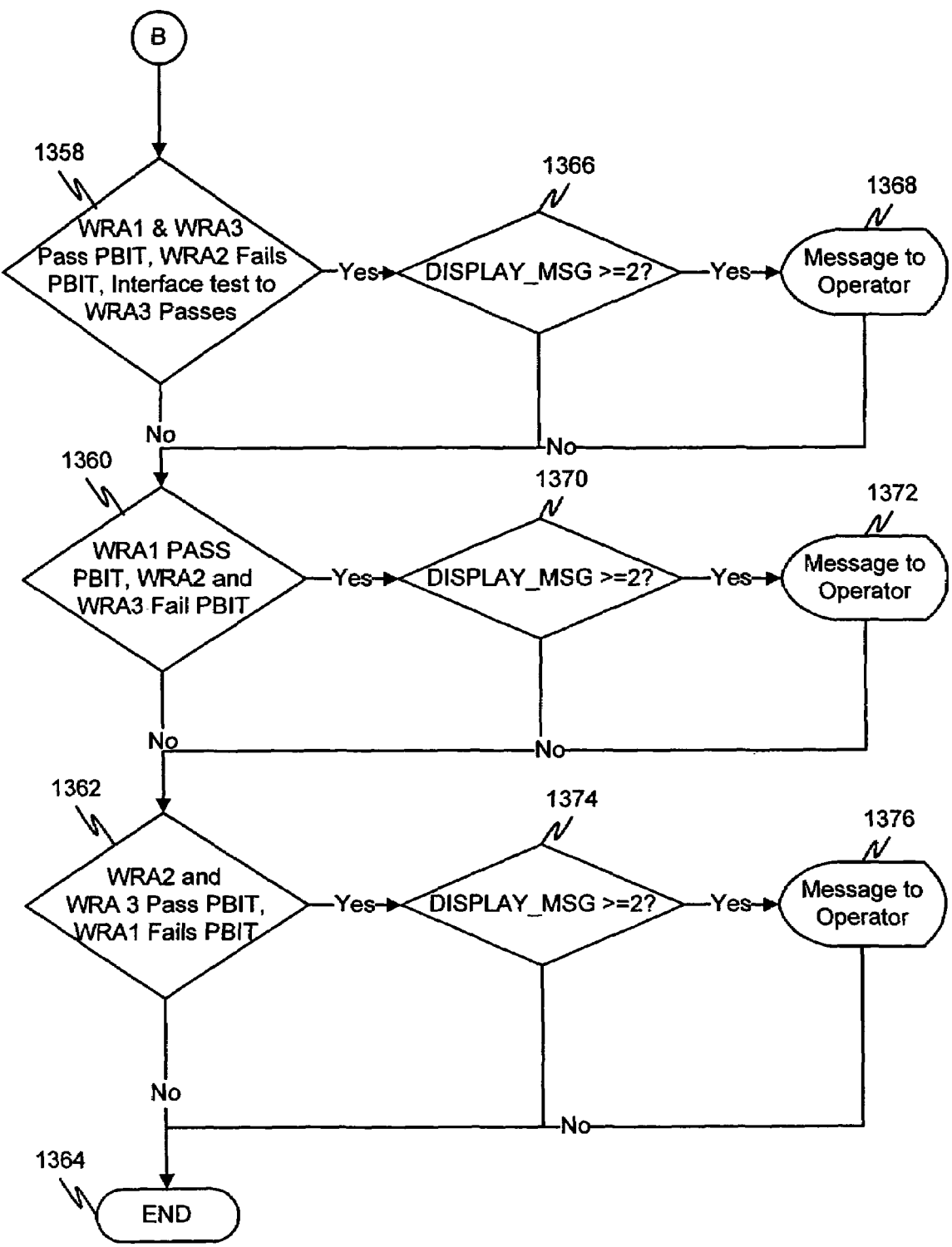
FIG. 15 is a flowchart of a continuation of the exemplary diagnostic test flow sequence of FIG. 14.

In step 1324, if WRA 1 and WRA 3 pass PBIT, but WRA 2 fails PBIT and the interface from WRA 1 to WRA 3 passes, control continues to step 1354, otherwise, control continues to step 1325, where the control sequence continues to the flowchart shown in FIG. 15.

In step 1328, the CALL_PROC variable is evaluated. If CALL_PROC is equal to WRA 1 or WRA 2, control continues to step 1330, otherwise, control continues to step 1332. In step 1330, the fault group for the interface from WRA 1 to WRA 2 and for WRA 2 is displayed. Since the interface to WRA 3 passed, the fault may be isolated to the interface between the splice (where the interface in FIG. 12 splits from WRA 1 and connects to WRA 2 and WRA 3) and WRA 2 or to WRA 2 itself. Control then ends for this test sequence.

In step 1332, the DISPLAY_MSG variable is evaluated. If DISPLAY_MSG is greater than or equal to two, then a message is displayed to the operator, such as, for example, "WRA 1 interface to WRA 3 passed. Interface to WRA 2 failed. Probable cause is interface wiring between the splice and WRA 2. Run WRA 2 diagnostics to isolate." Control continues to step 1316.

In step 1336, the CALL_PROC variable is evaluated. If CALL_PROC is equal to WRA 1 or WRA 3, control continues to step 1338. Otherwise, control continues to step 1340. In step 1338, a fault group is displayed comprising the interface from WRA 1 to WRA 3 and WRA 3. Since the interface to WRA 2 passed, the fault may be isolated to the interface between the splice and WRA 3 or to WRA 3 itself. Control ends for this test sequence.

In step 1340, the DISPLAY_MSG variable is evaluated. If DISPLAY_MSG is greater than or equal to two, then control continues to step 1342. Otherwise, control continues to step 1318 (shown in FIG. 14).

In step 1342, a message is displayed to the operator, such as, for example, "WRA 1 interface to WRA 2passed. Interface to WRA 3 failed. Probable cause is interface wiring between the splice and WRA 3. Run WRA 3 diagnostics to isolate."Control continues to step 1318 (shown in FIG. 14).

The A sheet connector designates a connection onto the A designator of FIG. 14 for continuation of diagram shown in FIG. 13. FIG. 14 shows a continuation of the exemplary diagnostic test flow of FIG. 13.

In step 1344, a fault group is displayed containing the interface from WRA 1 to WRA 2 and WRA 3, WRA 1, WRA 2 and WRA 3. Control then ends for this test sequence.

In step 1346, the DISPLAY_MSG variable is evaluated. If DISPLAY_MSG is greater than or equal to two, then control continues to step 1348. Otherwise, control continues to step 1322.

In step 1348, a message is displayed to the operator, such as, for example, "WRA 1 interface to WRA 2 passed. Interface test to WRA 3 cannot be validated. WRA 3 did not pass critical BIT checks. Run WRA 3 to isolate." Control continues to step 1322

In step 1350, the DISPLAY_MSG variable is evaluated. If DISPLAY_MSG is greater than or equal to two, then control continues to step 1352. Otherwise, control continues to step 1324.

In step 1352, a message is displayed to the operator, such as, for example, "WRA 1 interface to WRA 2 failed. Interface test to WRA 3 cannot be validated, WRA 3 did not pass critical BIT checks. Run WRA 3 diagnostics to isolate."Control continues to step 1324.

In step 1354, the DISPLAY_MSG variable is evaluated. If DISPLAY_MSG is greater than or equal to two, control continues to step 1356. Otherwise, control continues to step 1325 where the control sequence continues to the flowchart shown in FIG. 15.

In step 1356, a message is displayed to the operator, such as, for example, "WRA 1 interface to WRA 3 passed. Interface test to WRA 2 cannot be validated, WRA 2 did not pass critical BIT checks. Run WRA 2 diagnostics to isolate." Control continues to step 1325, where the control sequence continues to the flowchart shown in FIG. 15.

In FIG. 15, the flowchart shows the continuation of the control sequence, which began in FIG. 13 and continued to FIG. 14. In particular, in step 1358, if WRA 1 and WRA 3 pass PBIT, but WRA 2 fails PBIT and the interface from WRA 1 to WRA 3 passes, control continues to step 1366, otherwise, control continues to step 1360.

In step 1360, if WRA 1 passes PBIT, but WRA 2 and WRA 3 fail PBIT and the interface form WRA 1 to WRA 3 fails, then control continues to step 1370, otherwise, control continues to step 1362.

In step 1362, if WRA 2 and WRA 3 pass PBIT, but WRA 1 fails PBIT, control continues to step 1374, otherwise, control continues to step 1364, where the control sequence ends.

In step 1366, the DISPLAY_MSG variable is evaluated. If DSIPLAY_MSG is greater than or equal to two, then control continues to step 1368. Otherwise, control continues to step 1360.

In step 1368, a message is displayed to the operator, such as, for example, "WRA1 interface to WRA3 FAILED. Interface test to WRA2 cannot be validated, WRA2 did not pass critical BIT checks. Run WRA2 diagnostics to isolate." Control continues to step 1360.

In step 1370, the DISPLAY_MSG variable is evaluated. If DISPLAY_MSG is greater than or equal to two, then control continues to step 1372. Otherwise, control continues to step 1362.

In step 1372, a message is displayed to the operator, such as, for example, "Interface test to WRA2 cannot be validated, WRA2 did not pass critical BIT checks. Run WRA2 diagnostics to isolate. Interface test to WRA3 cannot be validated, WRA3 did not pass critical BIT checks. Run WRA3 diagnostics to isolate." Control continues to step 1362.

In step 1374, the DISPLAY_MSG variable is evaluated. If DISPLAY_MSG is greater than or equal to two, control continues to step 1376. Otherwise, control continues to step 1364 where the control sequence ends.

In step 1376, a message is displayed to the operator, such as, for example, "Interface test to WRA1 cannot be validated, WRA1 did not pass critical BIT checks. Run WRA1 diagnostics to isolate." Control continues to step 1364, where the control sequence ends.

Although the enhanced diagnostic fault detection and isolation systems and methods of the present invention have been described and illustrated in conjunction with the troubleshooting of a military aircraft, the enhanced diagnostic fault detection and isolation systems and methods can be configured to troubleshoot any system having a number of interconnected components, such as the complex systems created by the aerospace, automotive, marine, electronics, power generation and computer industries. As such, the foregoing description of the utilization of the enhanced diagnostic fault detection and isolation systems and methods in the military aircraft industry was for purposes of illustration and example and not of limitation since the diagnostic procedure described above is equally applicable in many different industries.

According to the present invention, a system for enhanced diagnostic fault detection and isolation can be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic device such as a PLD, PLA, FPGA, PAL, neural network, artificial intelligence device, or the like. In general, any process capable of implementing the functions described herein can be used to implement a system for fault detection and isolation according to this invention.

Furthermore, the disclosed system may be implemented in software using object or object-oriented software development environments that may provide portable source code that can be used on a variety of computer platforms. Alternatively, the disclosed system for enhanced diagnostic fault detection and isolation may be implemented partially or fully in hardware using standard logic circuits or a VLSI design. Other hardware or software can be used to implement the systems in accordance with this invention depending on the speed and/or efficiency requirements of the systems, the particular function, and/or a particular software or hardware system, microprocessor, or microcomputer system being utilized. The enhanced diagnostic fault detection and isolation system illustrated herein can readily be implemented in hardware and/or software using any known or later developed systems or structures, devices and/or software by those of ordinary skill in the applicable art from the functional description provided herein and with a general basic knowledge of the computer and electrical arts.

Moreover, the disclosed methods may be readily implemented in software executed on programmed general-purpose computer, a special purpose computer, a microprocessor, or the like. In these instances, the systems and methods of this invention can be implemented as a program embedded on a personal computer such as JAVA®, XML or CGI script, as a resource residing on a server or graphics workstation, as a routine embedded in a dedicated encoding/decoding system, as an artificial intelligence program, neural network program, or the like. The system can also be implemented by physically incorporating the system and method into a software and/or hardware system, such as the hardware and software systems of an integrated electronic technical manual.

It is, therefore, apparent that there is provided in accordance with the present invention, systems and methods for enhanced diagnostic fault detection and isolation. While this invention has been described in conjunction with a number of embodiments, it is evident that many alternatives, modifications and variations would be or are apparent to those of ordinary skill in the applicable arts. Accordingly, applicants intend to embrace all such alternatives, modifications, equivalents and variations that are within the spirit and scope of this invention.

What is claimed is:

1. A fault detection and isolation apparatus for detecting and isolating faults in a helicopter comprising:
   an interface coupled to at least one helicopter subsystem and a processor, wherein said interface is a stand-alone module and comprises means for transferring data between the helicopter subsystem and the processor, and wherein the interface comprises a character conversion module comprising means for converting characters transferred between the helicopter subsystem and the processor, a data conversion module comprising means for converting data transferred between the helicopter subsystem and the processor and a format conversion module comprising means for converting a format of data transferred between the helicopter subsystem and the processor;
   wherein the processor includes a memory having software instructions embodied thereon for a test program sequence adapted to cause the processor to perform the steps of:
   identifying at least one subsystem of the apparatus for testing;

generating a test sequence defining an order of testing of the at least one subsystem identified for testing and an order of individual tests to be performed on each subsystem identified for testing;

skipping subsystem tests from a previous test program sequence that have been successfully completed within a predetermined period of time prior to beginning another test program sequence, wherein skipping is performed when a variable is a first state;

generating periodic built-in-test commands;

generating interface test commands;

generating initiated built-in-test commands;

generating manual test prompts receiving test result data from a periodic built-in-test, an interface test, an initiated built-in-test and a manual test;

processing the test result data, wherein processing test result data comprises conversion of built-in-test codes from numeric values into text messages;

detecting and isolating any faults to one or more candidate components associated with the detected faults; and storing a result of the detecting and isolating in a database, wherein the processor detects and isolates faults in the helicopter.

2. The fault detection and isolation apparatus of claim 1, further comprising organizing the database by one of the following group: error code, time of occurrence, and subsystem reporting a fault.

3. The fault detection and isolation apparatus of claim 1, further comprising a display element coupled to the processor and configured to display faults and maintenance procedures responsive to the test program sequence.

4. The fault detection and isolation apparatus of claim 1, wherein the interface is at least partially housed within the subsystem.

5. The fault detection and isolation apparatus of claim 1, wherein the interface is at least partially housed within the processor.

6. The fault detection and isolation apparatus of claim 1, wherein the interface is coupled to the processor and subsystem via a wireless coupling.

7. The fault detection and isolation apparatus of claim 1, wherein the processor and the display element are part of an integrated electronic technical manual.

8. The fault detection and isolation apparatus of claim 1, wherein the test program sequence is written in a mark-up language.

9. A diagnostic method for detecting and isolating faults in a complex system comprising:

identifying at least one subsystem of the complex system for testing;

generating a test sequence defining an order of testing of the at least one subsystem identified for testing and an order of individual tests to be performed on each subsystem identified for testing; and performing a subsystem fault detection and isolation test for each subsystem of the complex system identified for testing using a stand-alone interface module, wherein the subsystem fault detection and isolation test comprises:

checking prerequisite conditions;

requesting periodic built-in-test results if available, if periodic built-in-test results are not available, then requesting periodic built-in-test be performed and requesting the results of the periodic built-in-test;

receiving periodic built-in-test result data;

testing interfaces;

requesting execution of initiated built-in-test;

requesting the results of the initiated built-in-test once it has completed;

receiving initiated built-in-test result data;

indicating any detected faults and isolating and indicating one or more components that are associated with the detected faults; and displaying a report indicating faults detected and components isolated for corrective action according to test results, wherein the report comprises a fault log listing a fault code, a time the fault code occurred, and a subsystem or assembly where the fault occurred for each fault, and wherein the report is generated in response to at least one result code from one of the following group: a prerequisite test, a periodic built-in-test, a interface test, an initiated built-in-test and a manual test, in combination with a variable indicating the scope of the test that is being performed.

10. The fault detection and isolation method of claim 9, further comprising:

performing a manual test;

receiving results of the manual test; and incorporating the manual test results in the detecting and isolating of faults.

11. The fault detection and isolation method of claim 10, wherein the manual test comprises:

presenting a user with an explanation of the manual test to be performed;

waiting for the user to perform the manual test;

receiving input from the user indicating results of the manual test;

checking the manual test results in order to determine if there were any faults; and isolating any faults to one or more candidate components associated with the faults.

12. The fault detection and isolation method of claim 9, wherein the step of generating a test sequence defining an order of testing of the subsystems identified for testing and an order of individual tests to be performed on each subsystem identified for testing, is based on the physical hierarchy of the subsystems of the complex system.

13. The fault detection and isolation method of claim 12, further comprising the step of skipping subsystem tests from a previous test program sequence that have been successfully completed within a predetermined period of time prior to beginning another test program sequence, wherein said skipping is performed when a variable is a first state.

14. The fault detection and isolation method of claim 9, wherein the periodic built-in-test comprises:

performing mode tests;

performing data input and output tests;

evaluating detailed built-in-test results in order to determine if faults occurred; and isolating faults to one or more candidate components associated with the detected faults.

15. The fault detection and isolation method of claim 9, wherein the interface test comprises:

requesting message data;

receiving message data checking message status;

checking the message status and data in order to determine if faults occurred; and isolating faults to one or more candidate components associated with the detected faults.

16. The fault detection and isolation method of claim 9, wherein the initiated built-in-test comprises:
- prompting a user prior to starting a lengthy test, wherein a lengthy test is one that will exceed a predetermined time to complete, if a test is lengthy;
- requesting execution of an initiated built-in-test;
- receiving the results of the initiated built-in-test; and
- checking initiated built-in-test results in order to determine if there were any faults; and
- isolating any detected faults to one or more candidate components associated with the detected faults.

17. The fault detection and isolation method of claim 9, wherein the complex system is an aircraft.

18. The fault detection and isolation method of claim 9, wherein the complex system is a helicopter.

19. A fault detection and isolation apparatus for detecting and isolating faults in a complex system comprising:
- an interface coupled to at least one subsystem of the complex system and a processor, wherein said interface is a stand-alone module and comprises means for transferring data between the subsystem and the processor, and wherein the interface further comprises a character conversion module comprising means for converting characters transferred between the subsystem and the processor, a data conversion module comprising means for converting data transferred between the subsystem and the processor and a format conversion module comprising means for converting a format of data transferred between the subsystem and the processor;
- wherein the processor includes a memory having software instructions embodied thereon for a test program sequence that cause the processor to perform the steps of:
  - identifying at least one subsystem of the complex apparatus for testing;
  - generating a test sequence defining an order of testing of the at least one subsystem identified for testing and an order of individual tests to be performed on each subsystem identified for testing;
  - skipping subsystem tests from a previous test program sequence that have been successfully completed within a predetermined period of time prior to beginning another test program sequence, wherein skipping is performed when a variable is a first state;
  - generating periodic built-in-test commands;
  - generating interface test commands;
  - generating initiated built-in-test commands;
  - generating manual test prompts;
  - receiving test result data from the periodic built-in-test, the interface test, the initiated built-in-test and the manual test;
  - processing the test result data;
  - detecting and isolating any faults to one or more candidate components associated with the detected faults; and
  - storing the test result data in a database, wherein the database may be organized by one of the following group: error code, time of occurrence, and subsystem reporting a fault;
- wherein the processor detects and isolates faults in the complex apparatus.

20. The fault detection and isolation apparatus of claim 19, further comprising a display element coupled to the processor and configured to display faults and maintenance procedures responsive to the test program sequence.

21. The fault detection and isolation apparatus of claim 19, wherein the interface is at least partially housed within the subsystem.

22. The fault detection and isolation apparatus of claim 19, wherein the interface is at least partially housed within the processing element.

23. The fault detection and isolation apparatus of claim 19, wherein the interface is coupled to the processor and subsystem via a wireless coupling.

24. The fault detection and isolation apparatus of claim 19, wherein the processor and the display element are part of an integrated electronic technical manual.

25. The fault detection and isolation apparatus of claim 19, wherein the fault detection and isolation apparatus is adapted to detect and isolate faults within a helicopter.

26. The fault detection and isolation apparatus of claim 19, wherein the test program sequence is written in a mark-up language.

* * * * *